US012272362B2

(12) United States Patent
Moynihan et al.

(10) Patent No.: US 12,272,362 B2
(45) Date of Patent: Apr. 8, 2025

(54) NEAR REAL-TIME IN-MEETING CONTENT ITEM SUGGESTIONS

(71) Applicant: MICROSOFT TECHNOLOGY LICENSING, LLC, Redmond, WA (US)

(72) Inventors: Kevin Timothy Moynihan, Barcelona (ES); Abhishek Arun, London (GB); Ioannis Gabrielides, London (GB); Gaurav Sunil Anand, London (GB); Xiaohu Liu, London (GB); Sarunas Marciuska, Orpington (GB); Andrea Moro, London (GB); Jagruti Dushyant Pandya, London (GB); Giacomo Servadei, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 17/813,685

(22) Filed: Jul. 20, 2022

(65) Prior Publication Data
US 2023/0282218 A1  Sep. 7, 2023

(30) Foreign Application Priority Data
Mar. 1, 2022  (EP) .................................... 22382183

(51) Int. Cl.
*G10L 17/22* (2013.01)
*G06F 16/40* (2019.01)
(Continued)

(52) U.S. Cl.
CPC .............. *G10L 17/22* (2013.01); *G06F 16/40* (2019.01); *G06F 16/433* (2019.01);
(Continued)

(58) Field of Classification Search
CPC ......... G10L 17/22; G10L 17/02; G10L 17/04; G10L 17/06; G06F 16/40; G06F 16/433; G06F 16/435; G06F 40/103
(Continued)

(56) References Cited

U.S. PATENT DOCUMENTS 9,158,794 B2   10/2015  Higgins et al.
10,666,696 B2   5/2020  Bader-Natal et al.
(Continued)

OTHER PUBLICATIONS

"International Search Report and Written Opinion Issued in PCT Application No. PCT/US23/010723", Mailed Date: Apr. 20, 2023, 11 Pages.
(Continued)

*Primary Examiner* — Edwin S Leland, III
(74) *Attorney, Agent, or Firm* — Shook, Hardy & Bacon L.L.P.

(57) ABSTRACT

Various embodiments discussed herein are directed to improving existing technologies by causing presentation, to one or more user devices associated with one or more meeting attendees, of one or more indications of one or more content items during or before a meeting based at least in part on one or more natural language utterances associated with the meeting, a context of the meeting, and/or a context associated with one or more meeting attendees. In other words, particular embodiments automatically recommend relevant content items responsive to the real-time natural language utterances in the meeting, and/or other context.

18 Claims, 14 Drawing Sheets

(51) Int. Cl.
*G06F 16/432* (2019.01)
*G06F 16/435* (2019.01)
*G06F 40/103* (2020.01)
*G10L 17/02* (2013.01)
*G10L 17/04* (2013.01)
*G10L 17/06* (2013.01)

(52) U.S. Cl.
CPC .......... *G06F 16/435* (2019.01); *G06F 40/103* (2020.01); *G10L 17/02* (2013.01); *G10L 17/04* (2013.01); *G10L 17/06* (2013.01)

(58) Field of Classification Search
USPC ....................................................... 704/235
See application file for complete search history.

(56) References Cited

U.S. PATENT DOCUMENTS

| | | | |
|---|---|---|---|
| 10,958,457 B1 | 3/2021 | Davis et al. | |
| 11,947,894 B2* | 4/2024 | Tumbde | G06V 20/00 |
| 2013/0086057 A1* | 4/2013 | Harrington | G06F 16/951 |
| | | | 707/E17.014 |
| 2014/0082100 A1* | 3/2014 | Sammon | G06Q 10/101 |
| | | | 709/204 |
| 2016/0092578 A1 | 3/2016 | Ganani | |
| 2016/0117624 A1 | 4/2016 | Patel et al. | |
| 2017/0092264 A1* | 3/2017 | Hakkani-Tur | G10L 15/16 |
| 2017/0116552 A1* | 4/2017 | Deodhar | G06Q 10/0639 |
| 2018/0046957 A1 | 2/2018 | Yaari et al. | |
| 2019/0132265 A1* | 5/2019 | Nowak-Przygodzki | |
| | | | H04L 65/403 |
| 2019/0332994 A1 | 10/2019 | Adamson et al. | |
| 2019/0361851 A1 | 11/2019 | Rogynskyy et al. | |
| 2020/0402507 A1 | 12/2020 | Neelakantan et al. | |
| 2020/0410453 A1* | 12/2020 | Nalliah | G06F 16/93 |
| 2021/0073742 A1 | 3/2021 | Janakiraman et al. | |
| 2021/0092168 A1* | 3/2021 | Ranalli | H04M 3/567 |
| 2021/0264377 A1* | 8/2021 | Ebner | G06Q 10/1093 |
| 2021/0406601 A1* | 12/2021 | Narlikar | G06N 20/00 |
| 2023/0282218 A1* | 9/2023 | Moynihan | G06F 16/435 |
| | | | 704/235 |

OTHER PUBLICATIONS

"Extended Search Report Issued in European Patent Application No. 22382183.6", Mailed Date: Aug. 1, 2022, 8 Pages.

Doganata, et al., "Visualizing a Meetings as a Graph to Increase the Accessibility of Meeting Artifacts", In Proceedings of the International Conference on Human Factors in Computing Systems, Jan. 2011, 10 Pages.

* cited by examiner

NEAR REAL-TIME IN-MEETING CONTENT ITEM SUGGESTIONS

CROSS-REFERENCE SECTION

This application claims priority to European Patent Application No. 22382183.6, filed Mar. 1, 2022, the entire contents of which is hereby incorporated by reference in its entirety.

INTRODUCTION

Computer-implemented technologies can assist users in communicating with each other over communication networks. For example, some teleconferencing technologies use conference bridge components that communicatively connect multiple user devices over a communication network so that users can conduct meetings or otherwise speak with each other in near-real-time. In another example, meeting software applications can include instant messaging, chat functionality, or audio-visual exchange functionality via webcams and microphones for electronic communications. However, these existing technologies and others do not provide intelligent functionality for automatically recommending relevant content items (such as a file) during a meeting based on near real-time natural language utterances in the meeting. Moreover, these technologies are deficient in computer information security, user privacy, and computer resource consumption (such as disk I/O, network bandwidth, and network latency), among other deficiencies.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to improving existing technologies by causing presentation, to one or more user devices associated with one or more meeting attendees, of one or more indications of one or more content items (such as a file) during a meeting based at least in part on one or more natural language utterances associated with the meeting (such as an attendee that utters the file name), a context of the meeting (such as a meeting ID or topic), and/or a context associated with one or more meeting attendees (such as a pattern of specific historical files shared between the attendees of the same meeting name). In other words, particular embodiments automatically recommend relevant content items responsive to the real-time natural language utterances in the meeting, as well as other context.

In operation, some embodiments first detect a first natural language utterance of one or more attendees associated with the meeting, where the one or more attendees include a first attendee. For example, a microphone may receive near real-time audio data, and an associated user device may then transmit, over a computer network, the near real-time audio data to a speech-to-text service so that the speech-to-text service can encode the audio data into text data and then perform natural language processing (NLP) to detect that a user made an utterance.

Some embodiments additionally determine a plurality of content items associated with the meeting or first attendee. For example, some embodiments perform a computer read of a network graph to select nodes representing those content items that are closest, in distance, to a node represented by the first attendee or meeting.

Based on the first natural language utterance and at least one of: a first context associated with the meeting, a second context associated with the first attendee, and/or a third context associated with another attendee of the meeting, some embodiments determine a score for each content item of the plurality of content items. For example, particular embodiments can concatenate various data into a feature vector, such a first identifier that identifies the first attendee, the first natural language utterance, a second set of identifiers that each identify a respective attendee of the meeting, and a third identifier that identifies the meeting, which is then used, as input, to a weak supervision machine learning model, in order for the machine learning model to predict which content items are the most relevant content items to surface during specific times of the meeting. And based on the score, particular embodiments rank each content item of the plurality of content items.

Based at least in part on the ranking, particular embodiments cause presentation, during the meeting and to the first user device associated with the first attendee, of at least an indication of a first content item of the plurality of content items. For example, a model may predict that the first content item (a document) is the most relevant content item because it matches a user intent of what a meeting attendee is currently speaking about (for example, the attendee is explicitly referencing the document) and the same document was attached in a meeting invite in preparation for the meeting. Accordingly, particular embodiments will automatically cause presentation (for example, without a manual user request) of the document as a suggestion for the user to access and selectively refrain from causing presentation of other documents because they do not indicate the user intent or otherwise have relevant meeting or attendee context.

BRIEF DESCRIPTION OF THE DRAWINGS

The present invention is described in detail below with reference to the attached drawing figures, wherein.

DETAILED DESCRIPTION

Figure 1:
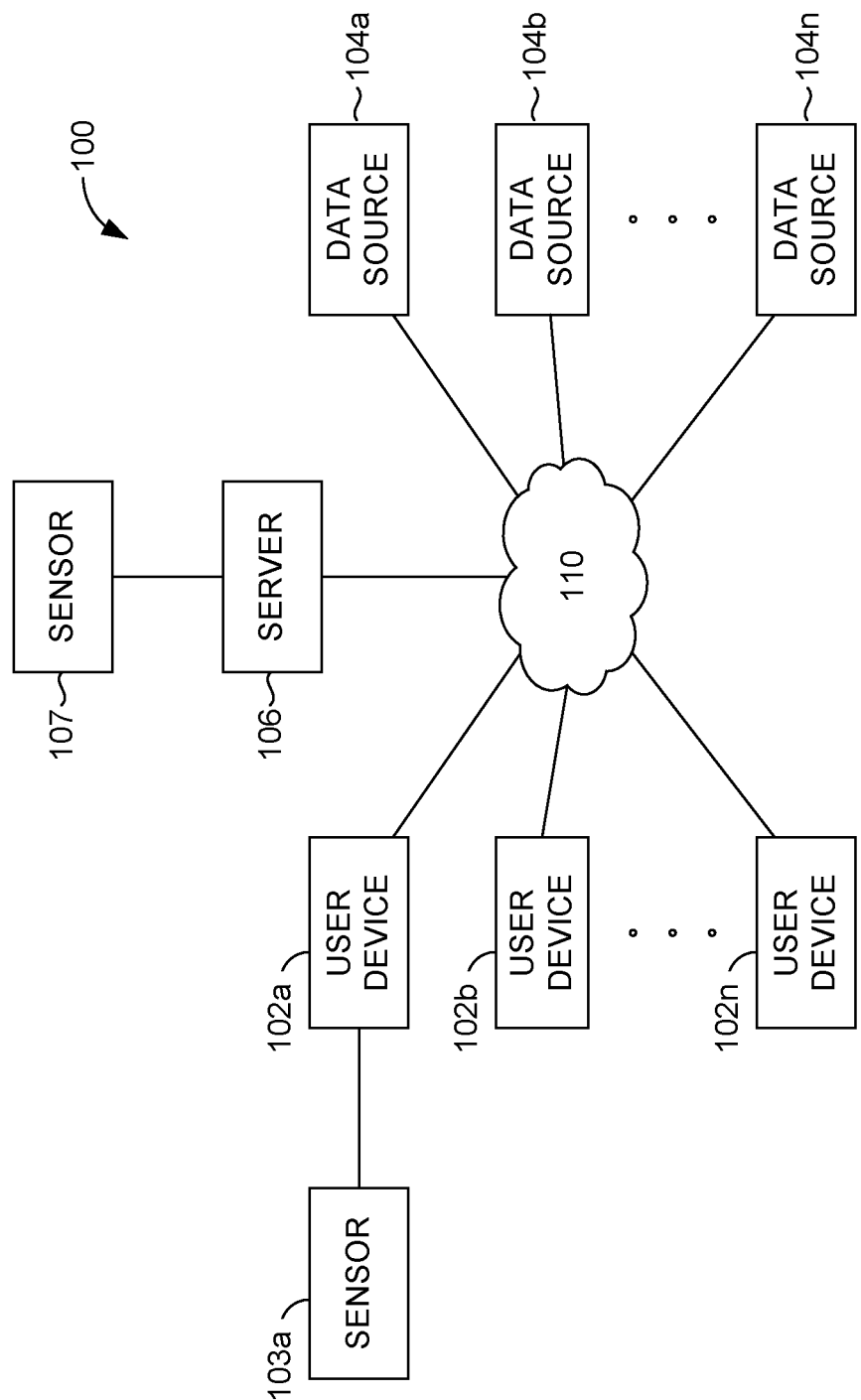
FIG. 1 is a block diagram illustrates an example operating environment suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As described above, existing technologies fail to intelligently recommend or provide content items (such as a document) during a meeting based on real-time natural language utterances in the meeting. For instance, some existing technologies, such as email applications or meeting applications are configured to store, in computer memory, manual user-attached files before a meeting starts. If the user desires to view the files, these technologies require an explicit user query or other user activity (such as clicks) to manually search for or surface the files. For example, a first user may send out a meeting invitation in a calendaring application, along with several documents that will be discussed in the meeting. When the meeting starts or when users start talking about a particular file in the meeting, the user may be required to manually retrieve the particular file in an email application via a search query. However, all of these actions not only negatively affect the user experience, but the corresponding user interfaces are static in nature. Because these existing applications require the user to manually retrieve data, users have to arduously drill down various user interface pages to find the appropriate file, or issue the query, which still requires computers to generate correct search results and users to identify the specific document, thereby negatively affecting accuracy and user experience. Moreover, the human-computer interaction is static in nature. As stated above, if a user needs a particular file, the user is required to issue basic queries or selections for a computer to retrieve the file. But the computer does not automatically retrieve the files during the meeting based on near real-time natural language utterances of a meeting and does not responsively select a file based on user input.

Existing technologies also fail to intelligently and automatically cause presentation of content items (or indications thereof, such as links to content items) or generate content items before a meeting starts. For example, if a user desires to make an agenda document or pre-read document, existing technologies, such as word processing technologies, require users to manually input each character sequence, which is not only time consuming, but increases storage device I/O. After a particular quantity of time, these technologies require storage managers to reach out to a storage device, such as disk, to store what the user has generated, which often happens multiple times while a user is generating a single document. However, reaching out to disk multiple times is expensive, as it requires the read/write head to mechanically identify the correct platter and sector multiple times, which eventually puts wear on the read/write head. Even if the user has already generated an agenda item document or pre-read document and wishes to retrieve it before a meeting, the user still has to manually open operating system dialogue boxes or the like to surface the document, which is still arduous and requires unnecessary drill down or query requests.

Existing technologies are also deficient with respect to computer information security and user privacy. For example, particular meeting applications use supervised machine learning models in order to predict which utterances in a meeting correspond to action items or the like. In order to make such prediction, these models require human annotators, such as subject matter experts, to view private plain text user emails, chats, and other documents so that they can label them as an action item or not, in order to set the ground truth for the model. However, this obviously comprises users as the human annotators or remote users can steal sensitive information located in these documents, such as phone numbers, social security numbers, credit card information, and the like. Moreover, existing technologies fail to incorporate access control mechanisms to keep users from accessing content items they are not supposed to view.

Existing technologies also consume an unnecessary amount of computing resources, such as network bandwidth, network latency, and I/O when searching for content items. For example, as described above, some meeting applications predict whether certain natural language utterances correspond to an action item or other types. In order to make this prediction, existing technologies walk entire decision trees or other data structures or communicate, over a network, to various services to search for content items that offer clues for action item detection. For instance, each node of a graph can represent a signal or data source to poll or monitor for to detect whether a natural language utterance is an action item. But polling all data sources increases storage device I/O (excess physical read/write head movements on non-volatile disk) because each time a node is walked, components have to repetitively reach out to the storage device to perform read operations, which is time consuming, error prone, and can eventually wear on components, such as a read/write head. Moreover, polling all of these data sources increases network latency and reduces bandwidth because the same application is also performing real-time processing of utterances of a meeting, which is computationally expensive to process. This means that because there are a lot of bits dedicated to finding the content items for the prediction, there are significantly less bits available to process the utterances of the meeting, which reduces bandwidth. Such loss of bandwidth also causes jitter or latency issues with respect to processing the utterances, meaning that the full signal (a series of TCP/IP packets) is delayed, leading to fragmented or delayed utterances, such that it becomes hard to understand or hear what users are saying.

Various embodiments of the present disclosure provide one or more technical solutions to these technical problems, as well as other problems, as described herein. For instance, particular embodiments are directed to causing presentation, to one or more user devices associated with one or more meeting attendees, of one or more indications (such as a link) of one or more content items (such as a file) during a meeting based at least in part on one or more natural language utterances, a context of the meeting (such as a meeting ID or topic), and/or a context associated with one or more meeting attendees (such as a pattern of specific files shared between the attendees). In other words, particular embodiments automatically recommend relevant content items during a meeting based at least in part on real-time natural language utterances in the meeting.

In operation, some embodiments first detect a first natural language utterance of one or more attendees associated with the meeting, where the one or more attendees include a first attendee. For example, a microphone may receive near real-time audio data, and an associated user device may then transmit, over a computer network, the near real-time audio data to a speech-to-text service so that the speech-to-text service can encode the audio data into text data and then perform natural language processing (NLP) to detect that a user made an utterance.

Some embodiments additionally determine a plurality of content items associated with the meeting or first attendee. For example, some embodiments perform a computer read of a network graph to select nodes representing those content items that are closest, in distance, to a node represented by the first attendee or meeting.

Based on the first natural language utterance and at least one of: a first context associated with the meeting, a second context associated with the first attendee, and/or a third context associated with another attendee of the meeting, some embodiments determine a score for each content item of the plurality of content items. For example, particular embodiments can concatenate various data into a feature vector, such a first identifier that identifies the first attendee, the first natural language utterance, a second set of identifiers that each identify a respective attendee of the meeting, and a third identifier that identifies the meeting, which is then used, as input, to a weak supervision machine learning model, in order for the machine learning model to predict which content items are the most relevant content items to surface during specific times of the meeting. And based on the score, particular embodiments rank each content item of the plurality of content items.

Based at least in part on the ranking, particular embodiments cause presentation, during the meeting and to the first user device associated with the first attendee, of at least an indication of a first content item of the plurality of content items. For example, a model may predict that the first content item (a document) is the most relevant content item because it matches a user intent of what a meeting attendee is currently speaking about (for example, the attendee is explicitly referencing the document) and the same document was attached in a meeting invite in preparation for the meeting. Accordingly, particular embodiments will automatically cause presentation (for example, without a manual user request) of the document as a suggestion for the user to access and selectively refrain from causing presentation of other documents because they are not ranked high enough.

Particular embodiments improve existing technologies because of the way they score or rank each content item of multiple content items and/or because they cause presentation of indications of content items during a meeting based on the scoring or ranking. For example, scoring and presentation can be based on factors such as real-time natural language utterances in a meeting and/or other contexts, such as meeting topic or attendee ID. Instead of requiring an explicit user query or other user activity (such as clicks) to manually search for or surface content items, particular embodiments automatically provide such content items based on unique rules or factors (for instance, providing content items that match natural language utterances of meetings, or providing content items based on users downloading those content items as attachments in previous emails). For example, using the illustration above, if a first user sends out a meeting invitation in a calendaring application, along with several documents that will be discussed in the meeting, particular embodiments may automatically score each of those documents based on a near real-time natural language utterance (such as a participant explicitly referenced a document), and an ID of the meeting (meeting context). In some instances, the generated score alone is a technical solution to these problems because the most relevant content items are surfaced. When the meeting starts or when users start talking about a particular file, particular embodiments will automatically cause presentation of an indication (such as a link) to the particular file based on the scoring, instead of requiring the user to manually retrieve the particular file in an email application via a search query. Such presentation is an additional technical solution in and of itself to these technical problems.

Particular embodiments improve user interfaces and human-computer interaction by automatically causing presentation of indications of content items during a meeting, thereby negating the requirement for users having to arduously drill down various pages to find the appropriate file, or issue a query. Instead, for example, users can be presented with a tile, toast, or other user interface element that is automatically surfaced along with at least a first content item. Instead of requiring a user to issue static queries or selections for a computer to retrieve each file of multiple files, particular embodiments cause a computer to automatically retrieve each file (or other content item) during the meeting based on near real-time natural language utterances of a meeting and responsively selects a content item based on user input. For example, a toast can automatically be presented to a user device along with a ranked list of content items based on the score. Based on receiving an indication that a user has selected an indicator that references a particular content item, among the ranked list, particular embodiments select the content item and cause presentation an indication of the content item, thereby improving human-computer interaction since the computer automatically surfaces various candidate content items but only selects one for presentation based on a user selection instead of surfacing each content item to a user based on manual explicit computer queries or selections.

Some embodiments improve existing technologies by intelligently and automatically causing presentation of indications of content items or generating content items to users before a meeting starts. For example, if a user desires to make an agenda document or pre-read document, particular embodiments automatically generate the contents of such agenda or pre-read document based a context associated with the meeting (such as a meeting topic, the specific attendees, and existing emails that discuss the meeting). For example, particular embodiments can locate a historical email as well as a file that discusses the subject matter of the meeting, and copy specific content from both sources into a single document that summarizes the agenda items. Such actions decrease storage device I/O because particular embodiments perform a single write (or fewer writes) to a storage device to generate the document, as opposed to repeatedly storing or writing manual user inputs to a storage device, as is required with existing technologies. Accordingly, particular embodiments, for example, reach out to disk fewer times, which causes the read/write head to mechanically identify the platter and/or sector fewer times, which puts less wear on the read/write head. Even if the user has already generated an agenda item document or pre-read document and wishes to retrieve it before a meeting, various embodiments can automatically cause presentation of such document, which is much less arduous and causes less drill down because the user is not having to manually open operating system dialogue boxes or the like to surface the document.

Various embodiments also improve computer information security and user privacy relative to existing technologies. For example, instead of using supervised machine learning models to make predictions, particular embodiments use weak supervision models. Weak supervision models are models that can use any flexible (noisy, imprecise, or limited) data source and programmatically or heuristically label training data in a supervised context without using human annotators. As described above, in order to makes predictions, existing supervised models require human annotators to view private user emails, chats, and other documents so that they can label them as an action item or not, in order to set the ground truth for the model. However, particular embodiments improve these models by programmatically assigning, without a human annotator, particular labels. In this way, no human annotators can view or steal private data, such as credit card information, phone numbers, and the like. Moreover, some embodiments encrypt such personal information so that no other remote user can access this information.

Moreover, particular embodiments improve security and user privacy by incorporating access control mechanisms to keep users from accessing content items they are not supposed to access. For example, during a meeting, particular embodiments only cause presentation to a user device associated with a user of a private email but refrain from causing presentation of the private email to a second attendee based on the second attendee not having access rights to the private email. In other words, while particular embodiments automatically recommend or cause presentation of relevant content items (such as a file) during a meeting based on real-time natural language utterances in the meeting (a user explicitly talking about the file), such recommendation or presentation does not happen at the expense of compromising user privacy—such content items are not caused to be presented to user devices of users that do not have access, which may be private to a given user.

One of the access control mechanisms that improve existing technologies is the concept of causing presentation of indications of content items to users in response to receiving a user request from a user that has access to those content items to share such content items. For example, particular embodiments may cause presentation, to a user device of a first attendee, of a private email based on real-time conversations in a meeting regarding content inside the email. Some embodiments cause a prompt to be displayed to the user device asking if the first attendee would like to share to other attendees of the meeting. Subsequently, particular embodiments receive a request for the first attendee to share the email to a second attendee of the meeting. In response to the receiving of the request, some embodiments cause presentation of the first content item to a second user device associated with the second attendee.

Particular embodiments also improve other computing resource consumption, such as network bandwidth, network latency, and I/O when searching for content items. Specifically, particular embodiments improve computing resource consumption by determining a plurality of content items associated with a first attendee or meeting (or determining that the content items are in fact associated with the first attendee or meeting) that are candidates for presentation during a meeting. Instead of walking entire decision trees or other data structures when determining content items, particular embodiments can determine that a subset of content items are likely to be relevant for a meeting or particular attendee. For instance, the determining of the plurality of content items can include performing a computer read of a network graph and selecting the plurality of content items among other content items, where several nodes represent a content item to analyze. Embodiments can "prune" or remove particular nodes of a graph that do not represent those content items most relevant to the attendee or meeting. For instance, only nodes representing content items within a threshold distance of a node representing a user may be selected. In another example, only content items where the edges indicate a strength of relationship over a threshold (for example, via the thickness of the edges) are considered. In this way, the entire graph does not have to be walked, and more generally, each content item unrelated to a particular meeting or user does not have to be considered or monitored.

Accordingly, this reduces storage device I/O (excess physical read/write head movements on non-volatile disk) because the walking of the graph occurs on fewer nodes or fewer content items are analyzed, and therefore embodiments reach out to the storage device fewer times to perform read/write operations, which wears less on the read/write head. Moreover, because fewer data sources, nodes, or content items are considered, this decreases network latency and reduces bandwidth. This is because relative to existing technologies, there are less bits dedicated to finding the content items for the prediction since there are fewer content items to consider. Consequently, there are significantly more bits available to process the natural language utterances of the meeting, which increases bandwidth. Such bandwidth savings therefore reduces jitter or other latency issues with respect to processing the utterances, meaning that the full signal is not as likely to be delayed, leading to less fragmented or less delayed utterances, such that it becomes easier to understand or hear what users are saying.

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (for example, databases or other data stores), such as data sources 104a and 104b through 104n; server 106; sensors 103a and 107; and network(s) 110. It should be understood that environment 100 shown in FIG. 1 is an example of one suitable operating environment. Each of the components shown in FIG. 1 may be implemented via any type of computing device, such as computing device 1300 as described in connection to FIG. 13, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 102a or server 106 alternatively or additionally comprises one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (for example, HTML, pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 13 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, corpus, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n or server 106.

Figure 2:
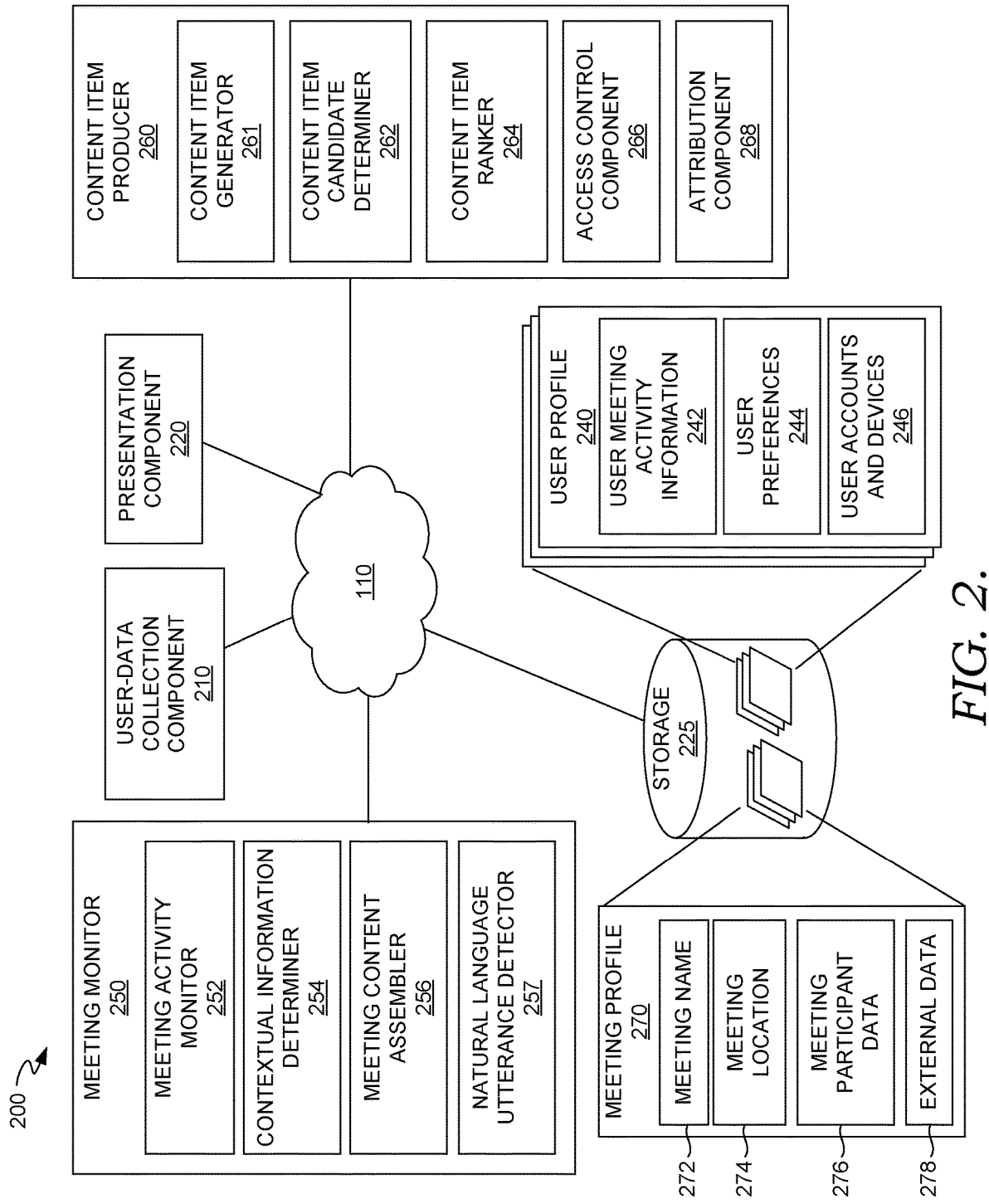
FIG. 2 is a block diagram depicting an example computing architecture suitable for implementing some embodiments of the disclosure.

Operating environment 100 can be utilized to implement one or more of the components of the system 200, described in FIG. 2, including components for scoring and causing presentation of indications candidate items during or before a meeting, as described herein. Operating environment 100 also can be utilized for implementing aspects of processes 1000, 1100, and/or 1200 described in conjunction with FIGS. 10, 11, and 12, and any other functionality as described in connection with FIGS. 2-13.

Referring now to FIG. 2, with FIG. 1, a block diagram is provided showing aspects of an example computing system architecture suitable for implementing some embodiments of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including meeting monitor 250, user-data collection component 210, presentation component 220, content item producer 260, and storage 225. These components may be embodied as a set of compiled computer instructions or functions, program modules, computer software services, or an arrangement of processes carried out on one or more computer systems, such as computing device 1300 described in connection to FIG. 13, for example.

In one embodiment, the functions performed by components of system 200 are associated with one or more personal assistant applications, services, or routines. In particular, such applications, services, or routines may operate on one or more user devices (such as user device 102*a*), servers (such as server 106), may be distributed across one or more user devices and servers, or be implemented in the cloud. Moreover, in some embodiments, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104*a* and 104*b* through 104*n* of FIG. 1. In some embodiments, user-data collection component 210 may be employed to facilitate the accumulation of user data of a particular user (or in some cases, a plurality of users including crowdsourced data) for the meeting monitor 250 or the content item producer 260. In some embodiments, a "user" as designated herein may be replaced with the term "attendee" of a meeting. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, GPS data, vehicle signal data, traffic data, weather data (including forecasts), wearable device data, other user device data (which may include device settings, profiles, network-related information (such as network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (for example, location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Continuing with FIG. 2, example system 200 includes a meeting monitor 250. The meeting monitor 250 includes meeting activity monitor 252 contextual information determiner 254, meeting content assembler 256, and natural language utterance detector 257. The Meeting monitor 250 is generally responsible for determining and/or detecting meeting features from online meetings and/or in-person meetings and making the meeting features available to the other components of the system 200. For example, such monitored activity can be meeting location (for example, as determined by geo-location of user devices), topic of the meeting, invitees of the meeting, attendees of the meeting, whether the meeting is recurring, related deadlines, projects, and the like. In some aspects, meeting monitor 250 determines and provides a set of meeting features (such as described below), for a particular meeting, and for each user associated with the meeting. In some aspects, the meeting may be a past (or historic) meeting or a current meeting. Further, it should be appreciated that the meeting monitor 250 may be responsible for monitoring any number of meetings, for example, each online meeting associated with the system 200. Accordingly, the features corresponding to the online meetings determined by meeting monitor 250 may be used to analyze a plurality of meetings and determine corresponding patterns.

In some embodiments, the input into the meeting monitor 250 is sensor data and/or user device data of one or more users at an event and/or contextual information from a meeting invite and/or email or other device activity of users at the meeting. In some embodiments, this includes user data collected by the user-data collection component 210 (which can be accessible via the user profile 240).

The meeting activity monitor 252 is generally responsible for monitoring meeting events (such as user activity) via one or more sensors, (such as microphones, video), devices, chats, presented content, and the like. In some embodiments, the meeting activity monitor 252 outputs transcripts or activity that happens during a meeting. For example, activity or content may be timestamped or otherwise correlated with meeting transcripts. In an illustrative example, the meeting activity monitor 252 may indicate a clock time at which the meeting begins and ends. In some embodiments, the meeting activity monitor 252 monitors user activity information from multiple user devices associated with the user and/or from cloud-based services associated with the user (such as email, calendars, social media, or similar information sources), and which may include contextual information associated with transcripts or content of an event. For example, an email may detail conversations between two participants that provide context to a meeting transcript by describing details of the meeting, such as purpose of the meeting. The meeting activity monitor 252 may determine current or near-real-time user activity information and may also determine historical user activity information, in some embodiments, which may be determined based on gathering observations of user activity over time and/or accessing user logs of past activity (such as browsing history, for example). Further, in some embodiments, the meeting activity monitor may determine user activity (which may include historical activity) from other similar users (i.e., crowdsourcing).

In embodiments using contextual information (such as via the contextual information determiner 254) related to user devices, a user device may be identified by the meeting activity monitor 252 by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (such as a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some embodiments, meeting activity monitor 252 monitors user data associated with the user devices and other related information on a user device, across multiple computing devices (for example, associated with all participants in a meeting), or in the cloud. Information about the user's devices may be determined from the user data made available via user-data collection component 210 and may be provided to the action item generator 260, among other components of system 200, to make predictions of whether character sequences or other content is an action item. In some implementations of meeting activity monitor 252, a user device may be identified by detecting and analyzing characteristics of the user device, such as device hardware, software such as OS, network-related characteristics, user accounts accessed via the device, and similar characteristics, as described above. For example, information about a user device may be determined using functionality of many operating systems to provide information about the hardware, OS version, network connection information, installed application, or the like. Similarly, some embodiments of meeting activity monitor 252, or its subcomponents, may determine a device name or identification (device ID) for each device associated with a user.

The contextual information extractor/determiner 254 is generally responsible for determining contextual information (also referred to herein as "context") associated with a meeting and/or one or more meeting attendees. This information may be metadata or other data that is not the actual meeting content or payload itself, but describes related information. For example, context may include who is present or invited to a meeting, the topic of the meeting, whether the meeting is recurring or not recurring, the location of the meeting, the date of the meeting, the relationship between other projects or other meetings, information about invited or actual attendees of the meeting (such as company role, whether participants are from the same company, and the like). In some embodiments, the contextual information extractor/determiner 254 determines some or all of the information by determining information (such as doing a computer read of) within the user profile 240 or meeting profile 270, as described in more detail below.

The natural language utterance detector 257 is generally responsible for detecting one or more natural language utterances from one or more attendees of a meeting or other event. For example, in some embodiments, the natural language utterance detector 257 detects natural language via a speech-to-text service. For example, an activated microphone at a user device can pick up or capture near-real time utterances of a user and the user device may transmit, over the network(s) 110, the speech data to a speech-to-text service that encodes or converts the audio speech to text data using natural language processing. In another example, the natural language utterance detector 257 can detect natural language utterances (such as chat messages) via natural language processing (NLP) only via, for example, parsing each word, tokenizing each word, tagging each word with a Part-of-Speech (POS) tag, and/or the like to determine the syntactic or semantic context. In these embodiments, the input may not be audio data, but may be written natural language utterances, such as chat messages. In some embodiments, NLP includes using NLP models, such as Bidirectional Encoder Representations from Transformers (BERT) (for example, via Next Sentence Prediction (NSP) or Mask Language Modeling (MLM)) in order to convert the audio data to text data in a document.

In some embodiments, the natural language utterance detector 257 detects natural language utterances using speech recognition or voice recognition functionality via one or more models. For example, the natural language utterance detector 256 can use one or more models, such as a Hidden Markov Model (HMM), Gaussian Mixture Model (GMM), Long Short Term Memory (LSTM), BERT, and/or or other sequencing or natural language processing model to detect natural language utterances and make attributions to given attendees. For example, an HMM can learn one or more voice patterns of specific attendees. For instance, HMM can determine a pattern in the amplitude, frequency, and/or wavelength values for particular tones of one or more voice utterances (such as phenomes) that a user has made. In some embodiments, the inputs used by these one or more models include voice input samples, as collected by the user-data collection component 210. For example, the one or more models can receive historical telephone calls, smart speaker utterances, video conference auditory data, and/or any sample of a particular user's voice. In various instances, these voice input samples are pre-labeled or classified as the particular user's voice before training in supervised machine learning contexts. In this way, certain weights associated with certain features of the user's voice can be learned and associated with a user, as described in more detail herein. In some embodiments, these voice input samples are not labeled and are clustered or otherwise predicted in non-supervised contexts.

An HMM is a computing tool for representing probability distributions. For example, HMM can compute the probability that audio input belong to a certain class such as human speech or specific attendee, as opposed to other classes of sounds over sequences of observations (for example, different voice input samples or portions of a single voice input sample). These tools model time series data. For example, at a first time window, a user may utter a first set of phenomes at a particular pitch and volume level, which are recorded as particular amplitude values, frequency values, and/or wavelength values. "Pitch" as described herein refers to sound frequency (for example, in Hertz) indicative of whether a voice is a deep or low voice or high voice. A "phenome" is the smallest element of sound that distinguishes one word (or word element, such as a syllable) from another. At a second time window subsequent the first time window, the user may utter another set of phenomes that have another set of sound values.

HMMs augment the Markov chain. The Markov chain is a model that provides insight about the probabilities of sequences of random variables, or states, each of which take on values from a set of data. The assumption with Markov chains is that any prediction is based only on the current state, as opposed to states before the current state. States before the current state have no impact on the future state. HMMs can be useful for analyzing voice data because voice phenomes of pitch, tones, or any utterances tend to fluctuate (depending on mood or the goal) and do not necessarily depend on prior utterances before a current state (such as a current window of 10 seconds of a single voice input sample). In various cases, events of interest or features are hidden in that they cannot be observed directly. For example, events of interest that are hidden can be the identity of the users that make utterances or are associated with voice input samples. In another example, events of interest that are hidden can be the identity in general of whether a sound corresponds to a natural language utterance of a human (as opposed to other sounds). Although an utterance or voice input data (such as frequency, amplitude, and wavelength values) are directly observed, the identity of the users who made the utterances or voice input samples is not known (it is hidden).

An HMM allows the model to use both observed events (a voice input sample) and hidden events (such as an identity of various attendees) that are essentially causal factors in a probability algorithm. An HMM is represented by the following components: a set of N states $Q=q_1, q_2 \ldots q_N$, a transition probability matrix $AA=a_{11} \ldots a_{ij} \ldots a_{NN}$, each $a_{ij}$ representing the probability of moving from state i to state j, s.t. $\Sigma_{j=1}^{N} a_{ij}=1 \; \forall i$, a sequence of T observations $O=o_1 o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation $o_t$ being generated from a state i and an initial probability distribution $\pi=\pi_1 \pi_2 \ldots \pi_N$ over states.

$\pi_i$ is the probability that the Markov chain will start in state i. Some states j may have $\pi_j=0$, meaning that they cannot be initial states.

The probability of a particular state (such as an identity of a user that uttered a first phenome sequence)) depends only on the previous state (such as an identity of a user that issued another particular phenome sequence prior to the first phenome sequence), thus introducing the Markov Assumption: $P(q_i|q_1 \ldots q_{i-1})=P(q_i|q_{i-1})$. The probability of an output observation $o_i$ depends only on the state that produced the observation $q_i$ and not on any other states or any other observations, thus leading to output independence $O(o_i|q_1 \ldots q_i \ldots, qr, o_1, \ldots, o_i, \ldots o_T)=P(o_i|q_i)$. This allows a component to state that given observations o (such as a first sub-portion of a voice input sample of a set of voice frequency values), the algorithm can find the hidden sequence of Q states (such as the identity of one or more attendees that issued each segment of each voice input sample).

In various embodiments, a HMM or other model is provided for each attendee (for example, of an organization or meeting) to train on their everyday calls or other voice samples in order to "learn" their particular voices (such as by learning the hidden variables of an HMM). Some embodiments re-train the voice model after every new call (or voice input sample ingested), which enables embodiments to continuously improve the user's voice model. Some embodiments alternatively or additionally use other models, such as LSTMs and/or GMMs, which are each described in more detail herein.

The meeting content assembler 256 receives meeting content, related contextual information (such as via the contextual information determiner 254), and natural language utterances detected via the natural language utterance detector 257, and generates an enriched meeting-activity timeline. In some embodiments, this timeline is a transcript document that includes tags and/or other associated content. For example, the timeline can include structured data (such a database) that includes records, where each record includes the timeline of each conversation or natural language utterance and a timestamp indicating when the natural language utterance started/stopped. The record can alternatively or additionally include contextual information, such as information about attendees of the meeting or the meeting itself (such as topic of the meeting, files, slides, or any information in the user profile 240 or meeting profile 270). The enriched meeting-activity timeline can be the output of the meeting monitor 250.

The user profile 240 generally refers to data about a specific user or attendee, such as learned information an attendee, personal preferences of attendees, and the like. The user profile 240 includes the user meeting activity information 242, user preferences 244, and user accounts and devices 246. User meeting activity information 242 may include indications of when attendees or speakers tend to mention content items that is identified via patterns in prior meetings, how attendees identify content items (via a certain name), and who they are talking to when they reference content items. For example, a particular attendee may always reference a content item during the last 5 minutes of a meeting. This information can be used by the content item ranker 264 to rank a content item for presentation, as described in more detail below. The user profile 240 may also include how attendees or speakers reference content items. For example, historical meeting events may indicate that a particular user always states "Xt5" to reference the name of the document. This can help the content item ranker 264 determine the intent of the natural language utterance was to refer to a corresponding content item.

The user profile 240 can include user preferences 244, which generally include user settings or preferences associated with meeting monitor 250. By way of example and not limitation, such settings may include user preferences about specific meeting (and related information) that the user desires to be explicitly monitored or not monitored or categories of events to be monitored or not monitored, crowdsourcing preferences, such as whether to use crowd-sourced information, or whether the user's event information may be shared as crowdsourcing data; preferences about which events consumers may consume the user's event pattern information; and thresholds, and/or notification preferences, as described herein. In some embodiments, user preferences 244 may be or include, for example: a particular user-selected communication channel (for example, SMS text, instant chat, email, video, and the like) for content items to be transmitted through.

User accounts and devices 246 generally refer to device IDs (or other attributes, such as CPU, memory, or type) that belong to a user, as well as account information, such as name, business unit, team members, role, and the like. In some embodiment, role corresponds to meeting attendee company title or other ID. For example, participant role can be or include one or more job titles of an attendee, such as software engineer, marketing director, CEO, CIO, managing software engineer, deputy general counsel, vice president of internal affairs, and the like. In some embodiments, the user profile 240 includes participant roles of each participant in a meeting. Participant role can help determine the score or rank of given content items, as described with respect to the content item ranker 264. This is because certain content items, such as files, are more likely to be surfaced to an attendee depending on the role of the attendee.

Meeting profile 270 corresponds meeting data and associated metadata (such as collected by the user-data collection component 210). The meeting profile 270 includes meeting name 272, meeting location 274, meeting participant data 276, and external data 278. Meeting name 272 corresponds to the title or topic (or sub-topic) of an event or identifier that identifies a meeting. Content items can be determined or ranked based at least in part on the meeting name 272, as described with respect to 262 and 264. This is because for certain meetings and the associated subject matter, certain content items are more or less likely to be relevant. For example, for a meeting where the topic is the accuracy of a machine learning model, any documents concerning model details, such as providing more test data, reducing error rate, and the like, are more likely to be presented than, for instance, in a meeting where the topic is sales tactics based on hand gestures and other body language habits.

Meeting location 274 corresponds to the geographical location or type of meeting. For example, Meeting location 274 can indicate the physical address of the meeting or building/room identifier of the meeting location. The meeting location 274 can alternatively or additionally indicate that the meeting is a virtual or online meeting or in-person meeting. The event location 274 can also be a signal for determining or ranking content items, as described with respect to 262 and 264. This is because certain meeting locations are associated with certain topics and content of a meeting is less or more likely to be considered content items based at least in part on the location or topic. For example, if it is determined that the meeting is at building B, which is a building where engineering testing occurs, certain documents are more likely to be relevant than others, such as those documents that describe instructions for testing, building, and the like.

Meeting participant data 276 indicates the names or other identifiers of attendees at a particular meeting. In some embodiments, the meeting participant data 276 includes the relationship between attendees at a meeting. For example, the meeting participant data 276 can include a graphical view or hierarchical tree structure that indicates the most managerial position at the top or root node, with an intermediate-level manager at the branches just under the managerial position, and a senior worker at the leaf level under the intermediate-level manager. In some embodiments, the names or other identifiers of attendees at a meeting are determined automatically or in near-real-time as users speak (for example, based on voice recognition algorithms) or can be determined based on manual input of the attendees, invitees, or administrators of a meeting. In some embodiments, in response to determining the event participant data 276, the system 200 then retrieves or generates a user profile 240 for each participant of a meeting.

External data 278 corresponds to any other suitable information that can be used to determine or rank content items via 262 or 264. In some embodiments, external data 278 includes any non-personalized data that can still be used to make predictions. For example, external data 278 can include learned information of human habits over several meetings even though the current participant pool for a current event is different than the participant pool that attended the historical meetings. This information can be obtained via remote sources such as blogs, social media platforms, or other data sources unrelated to a current meeting. In an illustrative example, it can be determined over time that for a particular organization or business unit, certain types of content items are always produced at the last 10 minutes of a meeting. Accordingly, for the last 10 minutes of a current meeting whose particular participant pool has never met before, a candidate is more likely to be predicted as a content item to render in a meeting based on the history of the particular organization or business unit.

Continuing with FIG. 2, the system 200 includes the content item producer 260. The content item producer 260 is generally responsible for selecting, for presentation, one or more content items during a meeting, or before a meeting starts for specific meeting attendees or users. The content item producer 260 includes the content item generator 261, the content item candidate determiner 262, the content item ranker 264, the access control component 266, and attribution component 268. In some embodiments, the functionality engaged in by the content item producer 260 is based on information contained in the user profile 240, the meeting profile 270, information determined via the meeting monitor 250, and/or data collected via the user-data collection component 210, as described in more detail below.

The content item generator 261 is generally responsible for generating content and/or formatting of content items. For example, the content item generator 261 can generate the words, sentences, paragraphs, bullet points, headers, and the like. Such generation can be indicative of creating an entirely new content item (such as a document) which did not previously exist. In some embodiments, for example, the content item generator 260, generates an agenda document or a pre-read document. An "agenda document" is a document that describes each item or topic that will be discussed for a given meeting. A "pre-read document" is a document (or set of documents) that gives contextual information, a summary, and/or background details of a specific meeting. For example, a meeting may discuss sales numbers for a certain business unit across multiple geographical areas. A pre-read may include several documents that correspond to each geographical areas' specific sales figures for the certain business unit. Background and contextual information may be information or documents that provide definitions, figures, or other information needed to better be prepared for or understand a meeting.

In some embodiments, the content item generator 261 generates content item contents based on information contained in the user profile 240 and/or meeting profile 270. In an illustrative example, the content item generator 261 can include or use a model, such as a weak supervision model, to learn which content items are relevant (and not relevant) via information contained in the user profile 240 or meeting profile 270, produce a network graph based on the relevancies, and then walk the network graph a threshold distance away from a node representing a meeting to discover candidate content items, such as emails that discuss the meeting, documents attached to meeting invites, and the like. Such model and graph are described in more detail below. In some embodiments, the content item generator 261 extracts selected information or content from one or more of the candidate content items and generates a new document. For example, the content item generator 261 may extract, from multiple emails of different users, different natural language indicia corresponding to different topics that will be discussed in a meeting, and then insert the indicia into a new format (for example, a bullet point next to each topic, where bullet points did not previously exist) to create an agenda document.

In order to identify a "topic" or otherwise make sense of the resulting document, such as filling in missing words or text, some embodiments use natural language processing functionality, such as Named Entity Recognition (NER), NSP, or MLM. For example, extracted text from emails or other content items may include sentence fragments or incomplete sentences. Accordingly, some embodiments can finish the sentence fragments or incomplete sentences via training an encoder using NSP and MLM.

The content item candidate determiner 262 is generally responsible for determining a plurality of content items associated with an attendee and/or meeting. A "content item" as described herein refers to any suitable unit of data, such as a file or link to a file, a document or link to the document, an image (such as a digital photograph) or link to the image, an email, notification, a message, or the like. Content items typically represent some external piece of data relative to a meeting attendee utterance of a current meeting. Accordingly, a content item typically excludes any natural language utterance occurring during a meeting for which one or more content items will be presented. In some embodiments, such determined content items can exist among a larger set of content items unrelated to the meeting or specific user such that only the determined set of content items are analyzed, as described herein. In some embodiments, the content item candidate determiner determines which content items are associated with an attendee and/or meeting based on information contained in the user profile 240, meeting profile 270, and/or detected by the natural language utterance detector 257.

In some embodiments, the content item candidate determiner 262 determines the plurality of content items based on training and/or using one or more machine learning models, such as a supervised machine learning model, an unsupervised machine learning model, a semi-supervised machine learning model, a classification-based model, a clustering model, and/or a regression-based model. For example, such model can be a weak supervision neural network model that is trained to learn which content items were attached to meeting invites or are otherwise associated with particular meetings, as described in more detail below.

In some embodiments, the content item candidate determiner 262 additionally or alternatively determines the plurality of content items based on calling or accessing one or more data structures, such as a network graph. For example, a first node of a network graph may represent an attendee or meeting. In some embodiments, the content item candidate determiner 262 walks from the first node to a predetermined distance away to discover other nodes corresponding to the determine plurality of content items so that only a select quantity of content items closest to the first node are selected. Network graphs are described in more detail below.

The content item ranker 264 is generally responsible for determining or generating a score (such as an integer or confidence value) and ranking each of the content items determined by the content item candidate determiner 262. In some embodiments, such score is heuristically or statistically driven based on a set of programmatic rules. For example, a policy may indicate that if a natural language utterance detected via 257 includes description of a document that matches a name of a document, a data structure can be incremented with a first score (and not incremented or a lower score when there is no match), the first score can change to a second score based on the document being attached to a meeting invite for a meeting (whereas the first score does not change or is lower without such attachment), and the second score can change to a higher score if the document was shared by the user for which embodiments present the content item to (or a lower score may be given for documents not shared by the user).

Alternatively or additionally, the score is a machine learning model-based output such that the score reflects confidence levels, classifications, or other predictions for which content items are the most relevant. For example, using a given natural language utterance, a user ID, a meeting ID, and other attendee IDs as input, a model may predict that the most relevant content item is a first content item according to the natural language utterance to cause presentation of. Machine learning models are described in more detail below.

In some embodiments, the content item ranker 264 then ranks each content item according to the score. For example, in integer-based scores, content items may be ranked from a highest integer score to a lowest integer score. For example, a first ranked content item may have a score of 20, a second ranked content item may have a score of 15, and a third and last ranked content item may have a score of 8.

In some embodiments, with respect to confidence-scores, the content items are ranked from a highest confidence to a lowest confidence score. For example, given a specific natural language near real-time utterance detected via the natural language utterance detector 257, the ID of the meeting, and one or more attendees, the highest ranked document may be a document where embodiments are 90% confident that the intent of the natural language utterance is referring to the document, the user has access to the document (such as via the access control component 266) and/or is otherwise relevant given the context (such as a meeting context and user context). A second highest ranked document may be a document where a model is 80% confident that it is relevant for a given context even though there is a lower confidence that the intent of the natural language utterance was referring to the second highest ranked document. In an illustrative example, the first or highest ranked document may be the actual document that was referenced by a natural language utterance in a near real-time meeting, whereas the second or lower ranked document may be a document different than what was explicitly referenced in the natural language utterance, but is still relevant given the meeting context or other information within the user profile 240 or meeting profile 270.

In some embodiments, the content item ranker 264 weights individual scores (such as by increasing scores) or content items based on the individual features or factors that make up the score. For example, determining an intent of the document referenced via a natural language utterance detected via the natural language utterance detector 257 may be weighted the highest, which means that it is the most important factor for ranking. This may be important because some embodiments may only cause presentation of documents in near real-time relative to when they are referenced in a natural language utterance of a meeting. For example, a user may utter, "we talked about the sales figures last meeting." Particular embodiments may cause presentation, in near real-time relative to the time this was uttered and as a highest ranked document, a document where the sales figures are specified. It is understood that while various examples herein describe content items themselves being caused to be presented, indications of such content items can alternatively be caused to be presented.

In some embodiments, the content item ranker 264 may further weight, with a second highest weight score, content items that have the most personal affinity to a user for which a content item will be presented to. For example, a higher weight may be given to a document with more user activity or engagement (such as clicks, views, queries) for a specific user, relative to other documents that have little to not user activity by the same user. In some embodiments, documents that are associated with the particular meeting or attendees of a meeting, such as those attached to meeting invites, may also be given particular weight but may not be as important as documents reference in near real-time because they may not be as important to surface in near real-time relative to when an attendee is speaking or producing a natural language utterance. In an illustrative example, each document that was attached to a meeting invite or other emails that referenced the meeting may be given higher weights or scores relative to documents not attached to the meeting invite or emails.

The access control component 266 is generally responsible for determining whether a particular user or meeting attendee meets accessibility criteria to access (such as open a link to or view) a given content item, such as the ranked list of content items produced by the content item ranker 264. In some embodiments, the access control component 266 acts as a gatekeeping function to strictly allow or prohibit (via a binary yes or no value) access to content items based on the accessibility criteria regardless of the ranking of the content items via the content item ranker 264. In some embodiments, such accessibility criteria is defined in a data structure and defines a set of rules that a user must pass to gain access. For example, a first rule may specify that a first document is only accessible when a user has a specific company role or higher, such as level 2 manager or higher. A second rule may specify that a second document is accessible if the user device requesting it is associated with a specific business unit. In these embodiments a device ID may be mapped to a user ID and business unit in a data structure. In some embodiments, the accessibility criteria may additionally or alternatively be whether a given author of a content item has given explicit permissions for others to view the content item.

In some embodiments, the attribution component 268 is generally responsible for attributing particular content items to specific users or attendees in preparation for selecting and causing presentation of content items to the specific users. This takes into account that for a given meeting, different content items may be caused to be presented to different user devices associated with different attendees based on access control mechanisms and/or relevancy for different attendees, as described with respect to the content item ranker 264. For example, for a first attendee, a first document may be ranked highest and caused to be presented to the first attendee. However, a second attendee may not have access control rights to the first document or the first documents may not otherwise be ranked the highest for the second attendee. Accordingly, the first document may be attributed to the first attendee but not the second attendee for presentation.

In some embodiments, the attribution component 268 alternatively or additionally attributes or maps each selected or ranked content item to a specific natural language utterance detected via the natural language utterance detector 257. In this way, users can easily identify which content items are associated or belong to which natural language utterances, such as in a user interface. For example, a meeting may include 5 natural language utterances that each reference or are otherwise associated with different content items. Accordingly, at a first time and in near-real time relative to the time at which a first natural language utterance is uttered (or received), particular embodiments cause a first set of ranked content items to be presented next to an indicator that recites the first natural language utterance. At a second time subsequent to the first time, and in near-real time relative to the time at which a second natural language utterance is uttered in the same meeting, particular embodiments cause a second set of ranked content items to be presented next to a second indicator that recites the second natural language utterance. In this way, different content items can continuously be surfaced in near real-time according to the natural language utterances spoken.

Example system 200 also includes a presentation component 220 that is generally responsible for presenting content and related information to a user, such one or more ranked content items (or indications thereof) ranked via the content item ranker 264. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented. In particular, in some embodiments, presentation component 220 applies content logic to device features, associated logical hubs, inferred logical locations, or sensed user data to determine aspects of content presentation. For instance, clarification and/or feedback request can be presented to a user via presentation component 220.

In some embodiments, presentation component 220 generates user interface features associated with content items. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 220 determines when and how to present the content. In such embodiments, the content, including content logic, may be understood as a recommendation to the presentation component 220 (and/or personal assistant service or application) for when and how to present the notification, which may be overridden by the personal assistant app or presentation component 220.

Example system 200 also includes storage 225. Storage 225 generally stores information including data, computer instructions (for example, software program instructions, routines, or services), data structures, and/or models used in embodiments of the technologies described herein. By way of example and not limitation, data included in storage 225, as well as any user data, which may be stored in a user profile 240 or meeting profile 270, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (for example, the requested content) may be provided in user signals. A user signal can be a feed of various data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

Figure 3:
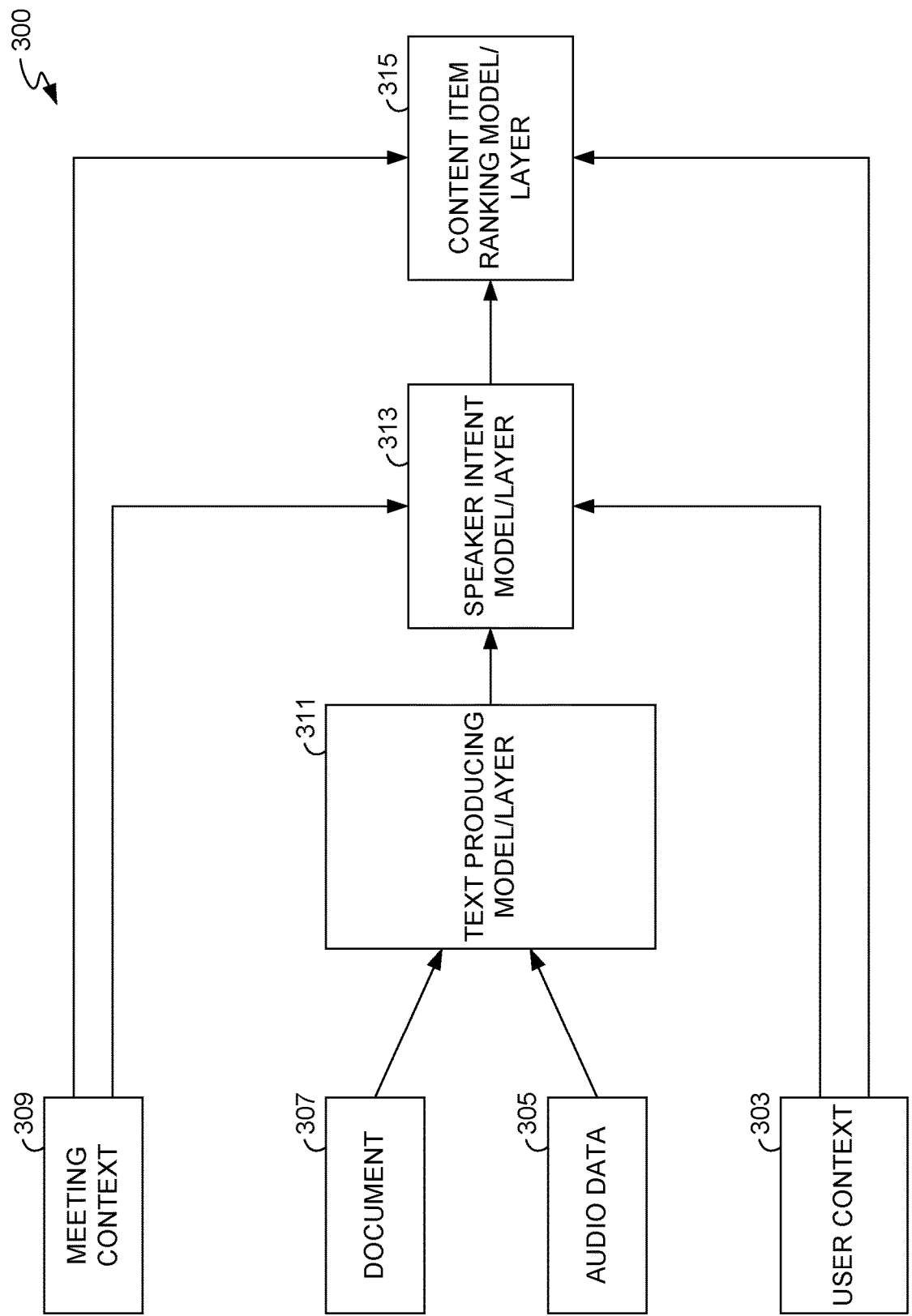
FIG. 3 is a schematic diagram illustrating different models or layers, each of their inputs, and each of their outputs, according to some embodiments.

FIG. 3 is a schematic diagram illustrating different models or layers, each of their inputs, and each of their outputs, according to some embodiments. At a first time, the text producing model/layer receives a document 307 and/or the audio data 305. In some embodiments, the document 307 is a raw document or data object, such as an image of a tangible paper or particular file with a particular extension (for example, PNG, JPEG, GIFF). In some embodiments, the document is any suitable data object, such as a web page (such as a chat page), an app activity, or the like. The audio data 305 may be any data that represents sound, where the sound waves from one or more audio signals have been encoded into other forms, such as digital sound or audio. The resulting form can be recorded via any suitable extensions, such as WAV, Audio Interchange File Format (AIFF), MP3, and the like. The audio data may include natural language utterances, as described herein.

At a second time subsequent to the first time, the text producing model/layer 311 converts or encodes the document 307 into a machine-readable document and/or converts or encodes the audio data into a document (both of which may be referred to herein as the "output document"). In some embodiments, the functionality of the text producing model/layer 311 represents or includes the functionality as described with respect to the natural language detector 257 and the meeting content assembler 256. For example, in some embodiments, the text producing model/layer 311 performs OCR on the document 307 (an image) in order to produce a machine-readable document. Alternatively or additionally, the text producing model/layer 311 performs speech-to-text functionality to convert the audio data 305 into a transcription document and performs NLP, as described with respect to the natural language utterance detector 257.

At a third time, subsequent to the second time, the speaker intent model/layer 313 receives, as input, the output document produced by the text producing model/layer 311 (for example, a speech-to-text document), meeting context 309, and/or user context 303 in order to determine an intent of one or more natural language utterances within the output document. In some embodiments, the speaker intent model/layer 313 is included in the content item ranker 264 and/or the content item candidate determiner 262. An "intent" as described herein refers to classifying or otherwise predicting a particular natural language utterance as belonging to a specific semantic meaning. For example, a first intent of a natural language utterance may be to open a first document, whereas a second intent may be to compliment a user on creating the first document. In some embodiments, those intents to surface content items are weighted higher or considered for content item suggestion predictions downstream. Some embodiments use one or more natural language models to determine intent, such as intent recognition models, BERT, WORD2VEC, and/or the like. Such models may not only be pre-trained to understand basic human language, such as via MLM and NSP, but can be fine-tuned to understand natural language via the meeting context 309 and the user context 303. For example, as described with respect to user meeting activity information 242, a user may always discuss a specific document at a certain time during a monthly meeting, which is particular user context 303. Accordingly, the speaker intent model/layer 313 may determine that the intent is to produce the certain document given that the meeting is the monthly meeting, the user is speaking, and the certain time has arrived. In another example, a specific document of a business unit may have a document called "XJ5", as indicated in the meeting context 309. Accordingly, such name can be detected in the phrase "let's look at XJ5" and it can be determined that the intent is to surface the XJ5 document by fine-tuning a BERT model on this term.

In some embodiments, the meeting context 309 refers to any data described with respect to the meeting profile 270. In some embodiments, the user context 303 refers to any data described with respect to the user profile 240. In some embodiments, the meeting context 309 and/or the user context additionally or alternatively represents any data collected via the user-data collection component 210 and/or obtained via the meeting monitor 250.

In some embodiments, an intent is explicit. For instance, a user may directly request or ask for a content item in the output document. However, in alternative embodiments, the intent is implicit. For instance, the user may not directly request or ask for a content item, but the meeting context 309 and/or the user context 303 indicates or suggests that a document would be useful to surface for a user. For example, an attendee might say, "the last email I sent you describes examples of the problem I'm talking about . . . " The attendee may not explicitly tell other attendees to open the email. However, the intent may still be to surface the email, as it might be useful.

At a fourth time subsequent to the third time, the content item ranking model/layer 315 model/layer 315 takes, as input, the intent predicted via the speaker intent model/layer 313, the meeting context 309, the user context 303, and/or a specific natural language utterance of the output document in order to predict, at the final output, the relevant content items. In some embodiments, the content item ranking model/layer 315 represents or includes the functionality as described with respect to the content item ranker 264.

Figure 4:
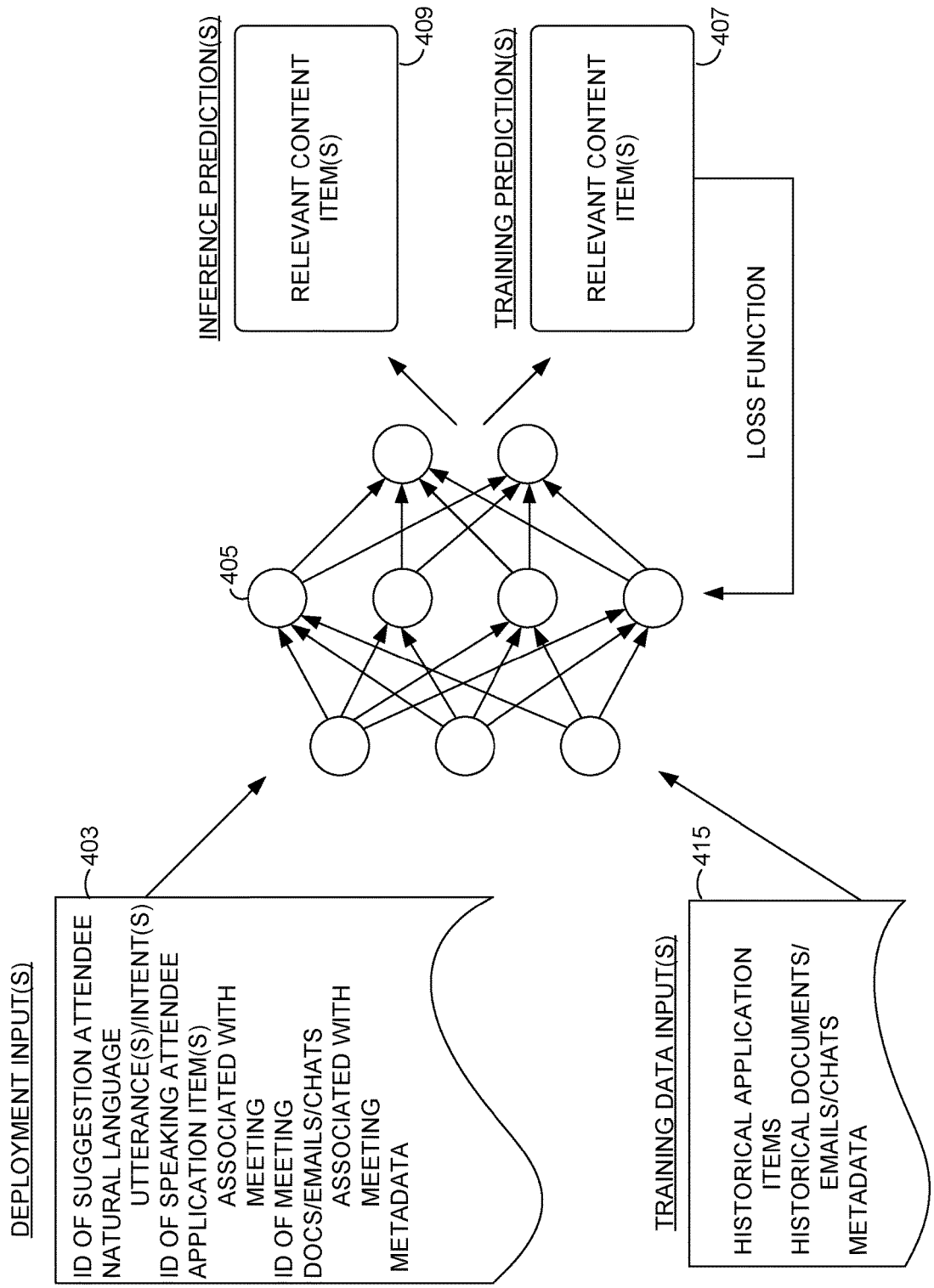
FIG. 4 is a schematic diagram illustrating how a neural network makes particular training and deployment predictions given specific inputs, according to some embodiments; embodiments.

FIG. 4 is a schematic diagram illustrating how a neural network 405 makes particular training and deployment predictions given specific inputs, according to some embodiments. In one or more embodiments, a neural network 405 represents or includes the functionality as described with respect to the content item ranking model/layer 315 of FIG. 3, the content item ranker 264 of FIG. 2, and/or the speaker intent model/layer 313 of FIG. 3.

In various embodiments, the neural network 405 is trained using one or more data sets of the training data input(s) 415 in order to make acceptable loss training prediction(s) 407, which will help later at deployment time to make correct inference prediction(s) 409. In some embodiments, the training data input(s) 415 and/or the deployments input(s) 403 represent raw data. As such, before they are fed to the neural network 405, they may be converted, structured, or otherwise changed so that the neural network 405 can process the data. For example, various embodiments normalize the data, scale the data, impute data, perform data munging, perform data wrangling, and/or any other pre-processing technique to prepare the data for processing by the neural network 405.

In one or more embodiments, learning or training can include minimizing a loss function between the target variable (for example, a relevant content item) and the actual predicted variable (for example, a non-relevant content item). Based on the loss determined by a loss function (for example, Mean Squared Error Loss (MSEL), cross-entropy loss, etc.), the loss function learns to reduce the error in prediction over multiple epochs or training sessions so that the neural network 405 learns which features and weights are indicative of the correct inferences, given the inputs. Accordingly, it may be desirable to arrive as close to 100% confidence in a particular classification or inference as possible so as to reduce the prediction error. In an illustrative example, the neural network 405 can learn over several epochs that for a given transcript document (or natural language utterance within the transcription document) or application item (such as a calendar item), as indicated in the training data input(s) 415, the likely or predicted correct content item is a specific email, file, or document.

Subsequent to a first round/epoch of training (for example, processing the "training data input(s)" 415), the neural network 405 may make predictions, which may or may not be at acceptable loss function levels. For example, the neural network 405 may process a meeting invite item (which is an example of an application item) of the training input(s) 415. Subsequently, the neural network 405 may predict that no specific content item is (or will be) attached to the meeting invite. This process may then be repeated over multiple iterations or epochs until the optimal or correct predicted value(s) is learned (for example, by maximizing rewards and minimizing losses) and/or the loss function reduces the error in prediction to acceptable levels of confidence. For example, using the illustration above, the neural network 405 may learn that the specific meeting invite item is associated with or likely will include a specific file.

In one or more embodiments, the neural network 405 converts or encodes the runtime input(s) 403 and training data input(s) 415 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, for a given detected natural language utterance of a given meeting and for a given suggestion user, embodiments can parse, tokenize, and encode each deployment input 403 value—an ID of suggestion attendee, a natural language utterance (and/or intent of such utterance), the ID of the speaking attendee, an application item associated with the meeting, an ID of the meeting, documents associated with the meeting, emails associated with the meeting, chats associated with the meeting, and/or other metadata (for example, time of file creation, last time a file was modified, last time file was accessed by an attendee), all into a single feature vector.

In some embodiments, the neural network 405 learns, via training, parameters, or weights so that similar features are closer (for example, via Euclidian or Cosine distance) to each other in feature space by minimizing a loss via a loss function (for example, Triplet loss or GE2E loss). Such training occurs based on one or more of the training data input(s) 415, which are fed to the neural network 405. For instance, if several meeting invites regarding the same meeting or meeting topic (a monthly sales meeting) attached the same file, then each meeting invite would be close to each other in vector space and indicative of a prediction that the next time the meeting invite is shared, there is a strong likelihood that the corresponding file will be attached or otherwise relevant for a meeting.

Similarly, in another illustrative example of training, some embodiments learn an embedding of feature vectors based on learning (for example, deep learning) to detect similar features between training data input(s) 415 in feature space using distance measures, such as cosine (or Euclidian) distance. For example, the training data input 415 is converted from string or other form into a vector (for example, a set of real numbers) where each value or set of values represents the individual features (for example, historical documents, emails, or chats) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a specific user or meeting ID, given the training input(s) 415, the neural network 405 can learn that particular content items are always associated with the meeting or specific user. For example, over 90% of the time, when a natural language sequence, "let's talk about XJ5 . . . " is said, the meeting participants always open a corresponding document, Consequently, this pattern can be weighted (for example, a node connection is strengthened to a value close to 1, whereas other node connections (for example, representing other documents) are weakened to a value closer to 0). In this way, embodiments learn weights corresponding to different features such that similar features found in inputs contribute positively for predictions.

One or more embodiments can determine one or more feature vectors representing the input(s) 515 in vector space by aggregating (for example, mean/median or dot product) the feature vector values to arrive at a particular point in feature space. For example, using the illustration above, each meeting invite may be a part of a separate feature vector (because they were separate events or for different meetings). Some embodiments, aggregate all of these related feature vectors because they represent the same type of meeting.

In one or more embodiments, the neural network 405 learns features from the training data input(s) 415 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. In some embodiments, such weights or strength of connections represent the weights described above with respect to the content item ranker 264 where, for example, at a first layer of a neural network, nodes representing near real-time utterances are weighted higher than nodes representing other features, such as personal affinity since one goal may be to produce the relevant content item according to what an attendee is currently speaking about. In another example, at a second layer of the neural network, specific content items are weighted higher based on their relationship strength or affinity to a particular user or meeting, as described with respect to FIG. 5.

In some embodiments, such training includes using a weak supervision model. Supervised learning is impractical when using sensitive data, such as enterprise data. Some embodiments define heuristics to programmatically label training and evaluation data. For example, some embodiments assigned a positive label to emails and files that were attached to in a meeting invite or shared/presented in an actual meeting and a negative label to all emails and files which a user (such as a meeting organizer) could have attached or shared but did not.

In one or more embodiments, subsequent to the neural network 405 training, the machine learning model(s) 405 (for example, in a deployed state) receives one or more of the deployment input(s) 403. When a machine learning model is deployed, it has typically been trained, tested, and packaged so that it can process data it has never processed. Responsively, in one or more embodiments, the deployment input(s) 403 are automatically converted to one or more feature vectors and mapped in the same feature space as vector(s) representing the training data input(s) 415 and/or training predictions). Responsively, one or more embodiments determine a distance (for example, a Euclidian distance) between the one or more feature vectors and other vectors representing the training data input(s) 415 or predictions, which is used to generate one or more of the inference prediction(s) 409.

In an illustrative example, the neural network 405 may concatenate all of the input(s) 503, which represents each feature value, into a feature vector. The neural network 405 may then match the user ID or other IDs (such as meeting) to the user ID stored in a data store to retrieve the appropriate user context, as indicated in the training data input(s) 415. In this manner, and in some embodiments, the training data input(s) 415 represent training data for a specific attendee or meeting. The neural network 405 may then determine a distance (for example, a Euclidian distance) between the vector representing the runtime input(s) 403 and each vector represented in the training data input(s) 415. Based on the distance being within a threshold distance, particular embodiments determine that for the given: detected natural language utterance and/or intent, meeting, user ID, and all corresponding deployment data (documents, emails, chats, metadata), the most relevant content item is Y. Therefore, the inference prediction(s) 409 can includes such content item Y. The "ID of suggestion attendee" refers to the ID of the user/attendee for which the content items will be presented to.

In certain embodiments, the inference prediction(s) 409 may either be hard (for example, membership of a class is a binary "yes" or "no") or soft (for example, there is a probability or likelihood attached to the labels). Alternatively or additionally, transfer learning may occur. Transfer learning is the concept of re-utilizing a pre-trained model for a new related problem (for example, a new video encoder, new feedback, etc.).

Figure 5:
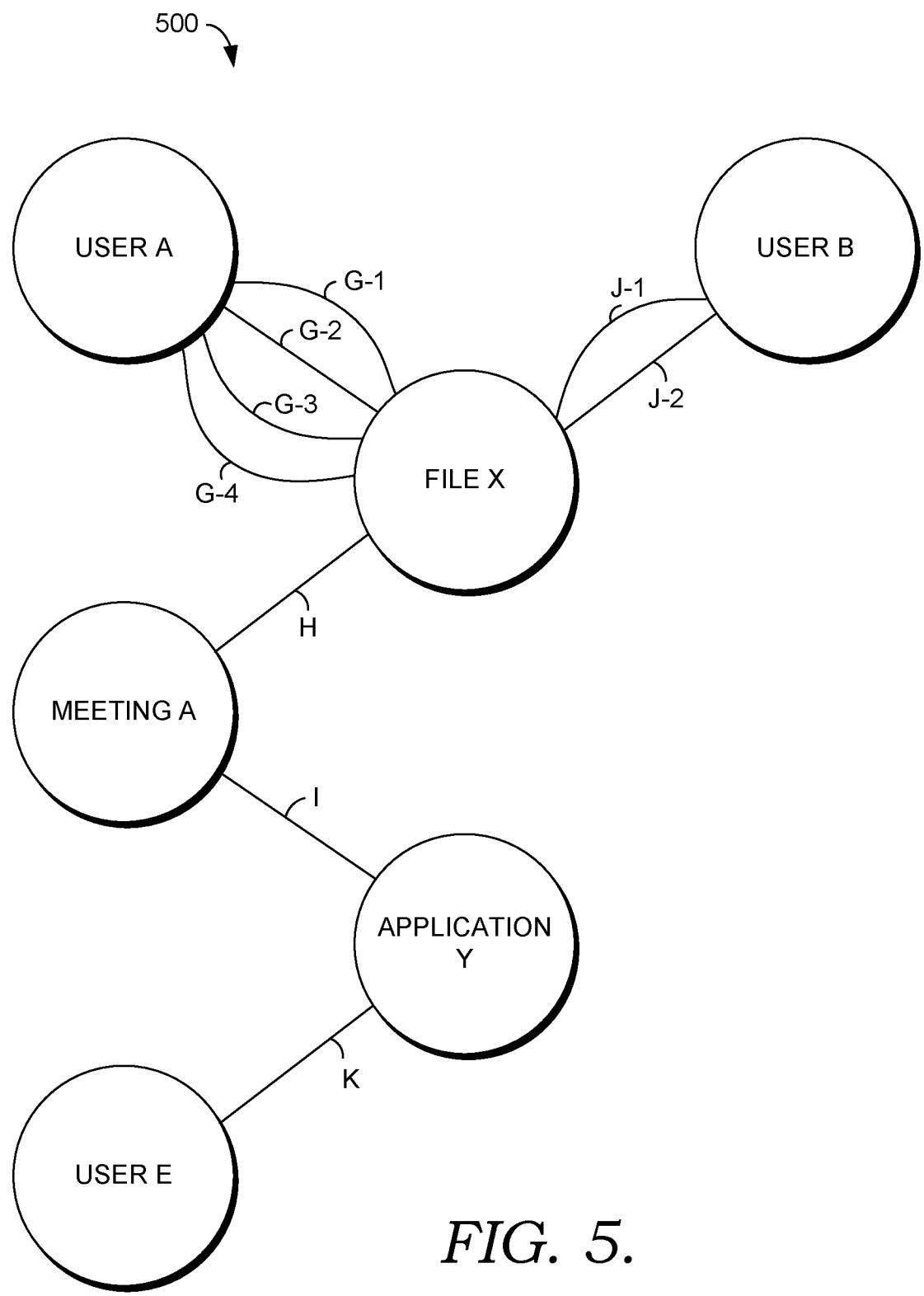
FIG. 5 is a schematic diagram of an example network graph, according to some embodiments.

FIG. 5 is a schematic diagram of an example network graph 500, according to some embodiments. In some embodiments, the network graph 500 represents the data structure utilized by the content item candidate determiner 262 to generate candidates and/or the content item ranker 264 to rank content items. A network graph is a visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 500 (an undirected graph) includes the nodes or vertices of: "user A," "user B," "file X," "Meeting A," "application Y," and "user E." The network graph further includes the edges K, I, H, J-1, J-2, and G-1, G-2, G-3, G-4.

The network graph 600 specifically shows the relationships between multiple users, a meeting, and content items, such as file X and application Y. It is understood that these content items are representative only. As such, the content items may alternatively or additionally be specific files, images, emails, chat sessions that users have engaged in, text messages that users have sent or received, and the like. In some embodiments, with respect to relationships between users and content items, the edges represent or illustrate the specific user interaction (such as a download, sharing, saving, modifying or any other read/write operation) with specific content items. In some embodiments, with respect to relationships between meeting A and content items, the edges represent a degree of association between the meeting and content items. For example, the more times file X has been downloaded to meeting invites associated with meeting A, the more thick the edges (or more edges) there will be between the corresponding nodes. In some embodiments, with respect to relationships between meeting A and specific users, the edges represent how often the specific users attend (or are invited to attend) the meeting, or otherwise a degree of association between the corresponding nodes Representing computer resources as vertices allow users, meeting, and content items to be linked in a manner they may not have otherwise have been. For example, application Y may represent a group container (such as MICROSOFT TEAMS) where electronic messages are exchanged between group members. Accordingly, the network graph 500 may illustrate which users are members of the same group. In another illustrative example, the network graph 500 may indicate that user A downloaded file X at a first time (represented by edge G-1), a second time (represented by edge G-2), a third time (represented by edge G-3), and a fourth time (represented by edge G-4). The graph 500 may also illustrates that user B also downloaded the file X, as represented by the edge J-1 and wrote to the file X at another time, as represented by the edge J-2. Accordingly, the network graph 500 illustrates a much stronger relationship between the user A and File X relative to user B based on the edge instances illustrated between the respective nodes (for example, user A downloaded File X more times relative to user B). In other embodiments, the thickness of a single edge is indicative of the degree of relationship strength. For example, instead of indicating 4 edges between user A an file X, there may be a single line between user A and file X that is thicker than any other edge between another user and file X, indicating the strongest relationship.

In aggregate, the network graph 500 indicates user A has interacted with File A many times, and user B has also interacted with file A. The network graph 500 further indicates that file X and application Y have a strong relationship with meeting A both with file X. The network graph 500 further indicates that user E has also interacted with application Y.

In various embodiments, the network graph 500 is used to determine or rank specific candidate content items associated with one or more of the particular users (user A, user B, or user E) and/or associated with meeting A. For example, some embodiments determine that file X is the most related to user A based on the quantity of edges and/or distance. In some embodiments, for example, the determination or raking of content items is performed by selecting meeting A's or user A's N closest nodes representing particular content items (such 3 content items within a particular distance threshold). For example, using the network graph 500, user A may have been the only user in the graph 500 invited to a meeting (not user B, user C, and user E). The network graph 500 may thus represent user A's network graph. One or more network graph rules may specify to select user A's two closest candidate items which is file X and application Y.

In various embodiments, closeness is determined based on using distance in network graphs. In some embodiments, a "distance" in terms of network graphs corresponds to a number of edges (or edge sets) in a shortest path between vertex U and vertex V. In some embodiments, if there are multiple paths connecting two vertices, then the shortest path is considered as the distance between two vertices. Accordingly, distance can be defined as d(U,V). For instance, the distance between user A and file X is 1 (because there is only 1 edge set G-1 through G-4), the distance between user A and user B (and meeting A) is 2, whereas the distance between user A and user E is 4 (because there are 4 edge sets between user A and user E). In some embodiments, content items are alternatively determined or ranked based on distance only regardless of the actual quantity of connections they may be selected (thus not being based on a "N" number of connections, as described above). For example, one or more network graph rules may specify to select all of the vertices or users as participant candidates that are at or within a distance of 4 of user A.

Some embodiments additionally or alternatively determine or rank content items by selecting the top N contentment items that the suggestion attendee (such as user A) has interacted the most (as determined by the number of edges between vertices) with files that are related to an event. For example, one or more network graph rules may specify to select only those content items who have two or more edges between them and a user or meeting, which in the illustration of FIG. 5, is file X only, and not application Y.

Some embodiments alternatively or additionally determine or rank content items by selecting N content items nearest to the "centeroid" of meeting A and/or a particular user. A "centeroid" in some embodiments refers to the geometric center of a set of objects (such as a mean position of the nodes in the network graph 500). For example, if only user B and user E were invited to a meeting (and not user A), the mean position of B and E may be File X. One or more network graph rules may specify to only select content items that are within a threshold distance of the centeroid—file X.

In some embodiments, there may be a similar but different network graph for each meeting attendee. This means that different users may view different content items even though they are a part of the same meeting and even though the same natural language utterance has been spoken. For example, network graph 500 may represent user A's graph. Because the user has accessed file X the most for given meeting A (as represented by the quantity of edges), particular embodiments may rank File X as highest to present to user A. However, user E's network graph may indicate that user E never downloaded or otherwise accessed file X with respect to meeting A, but rather has engaged in the most user activity with respect to application Y. Accordingly, for the same meeting or natural language utterance, particular embodiments cause presentation of application Y instead of file X.

In alternative embodiments, a same network graph exists for all users or a given meeting, such as in a meeting network graph. In this way, the same content items can be produced to every attendee in the meeting. For example, some embodiments walk the graph 500 to search for common files (such as via a Jaccard Index) in all meeting attendee graphs or a meeting graph, which may be file X and application Y. Such common files can be based on all users being invited to the meeting A, the project name, title of the meeting, whether group members report to the same supervisor, and the like.

In some embodiments, the network graph 500 is used as input into a machine learning model (such as the neural network 505), the content item ranking model/layer 315, and/or the content item ranker 264 so that the model can learn relationships between content items, meetings, and attendees even when there is no explicit link. Similarly, in some embodiments, the network graph 500 is used to set the weights of various neural network connections. For example, some embodiments weight the nodes representing content items (or words contained therein) in terms of personal affinity for a specific users. For instance, if network graph 500 represents user A's network graph, the closest content item is file X (or the most edges occurs between user A and File X) and is therefore given the highest weight, relative to application Y. In another example, weights can be assigned for every person with respect to user A. User A may talk to user B the most (because of a supervisor/supervisee relationship). Subsequently, at the ranking layer, the file associated with user B will get a higher weight because User A interacts with user B more than user E (based on the quantity of edges J-1 and J-2).

Figure 6:
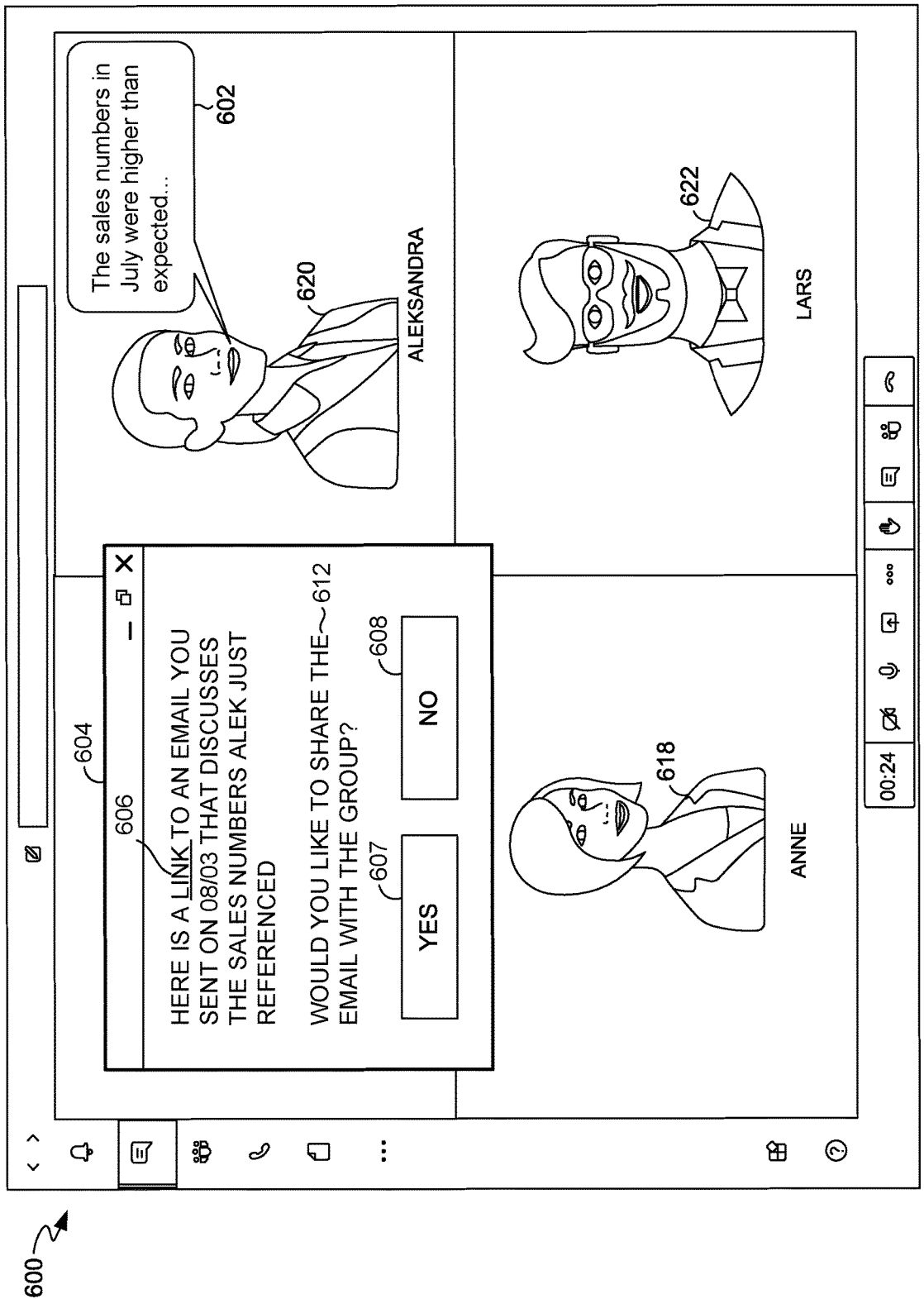
FIG. 6 is an example screenshot illustrating presentation of an indication (a link) of a content item, according to some embodiments.

Turning now to FIG. 6, an example screenshot 600 illustrating presentation of an indication 606 (a link) of a content item, according to some embodiments. In some embodiments, the presentation of the link 606 represents the output of the system 200 of FIG. 2, the content item ranking model/layer 315 of FIG. 3, and/or the inference prediction(s) 409 of FIG. 4. For example, the link 606 (or file referenced by the link 606) represents what is selected or ranked highest by the content item producer 260 of FIG. 2. In some embodiments, the screenshot 600 (as well as FIG. 7 through 9B) specifically represents what is caused to be displayed by the presentation component 220 of FIG. 2. In some embodiments, the screenshot 600 represents a page or other instance of a consumer application (such as MICROSOFT TEAMS) where users can collaborate and communicate with each other (for example, via instant chat, video conferencing, and/or the like).

Continuing with FIG. 6, at a first time the meeting attendee 620 utters the natural language utterance 602—"the sales number in July were higher than expected . . . " In some embodiments, in response to such natural language utterance 602, the natural language utterance detector 257 detects the natural language utterance 620. In some embodiments, in response to the detection of the natural language utterance, various functionality may automatically occur as described herein, such as the functionality as described with respect to one or more components of the content item producer 260, the text producing model/layer 311, the speaker intent model/layer 313, the content item ranking model/layer 315, the neural network 405, and/or a walk of the network graph 500 in order to rank content items. In response to determining that a particular email is ranked the highest or is otherwise the most optimal or suitable to present, the presentation component 220 automatically causes presentation, during the meeting, of the window 604, along with embedded indicia and corresponding link 606—"Here is a link to an email you sent on 08/03 that discusses the sales numbers Alek just referenced."

The window 604 also includes additional text 612 ("would you like to share the email with the group?"), which acts as an access control mechanism so that user device of other attendees in the group—attendee 620, 618—do not automatically receive the email, unlike attendee 622, who receives the content item 606 automatically. This is because, for example, the email may be private to attendee 622 or otherwise contain sensitive information. In response to receiving an indication that attendee 622 has selected the yes button 607, particular embodiments cause presentation of the link 606 to each of the user devices associated with the other meeting attendees.

Figure 7:
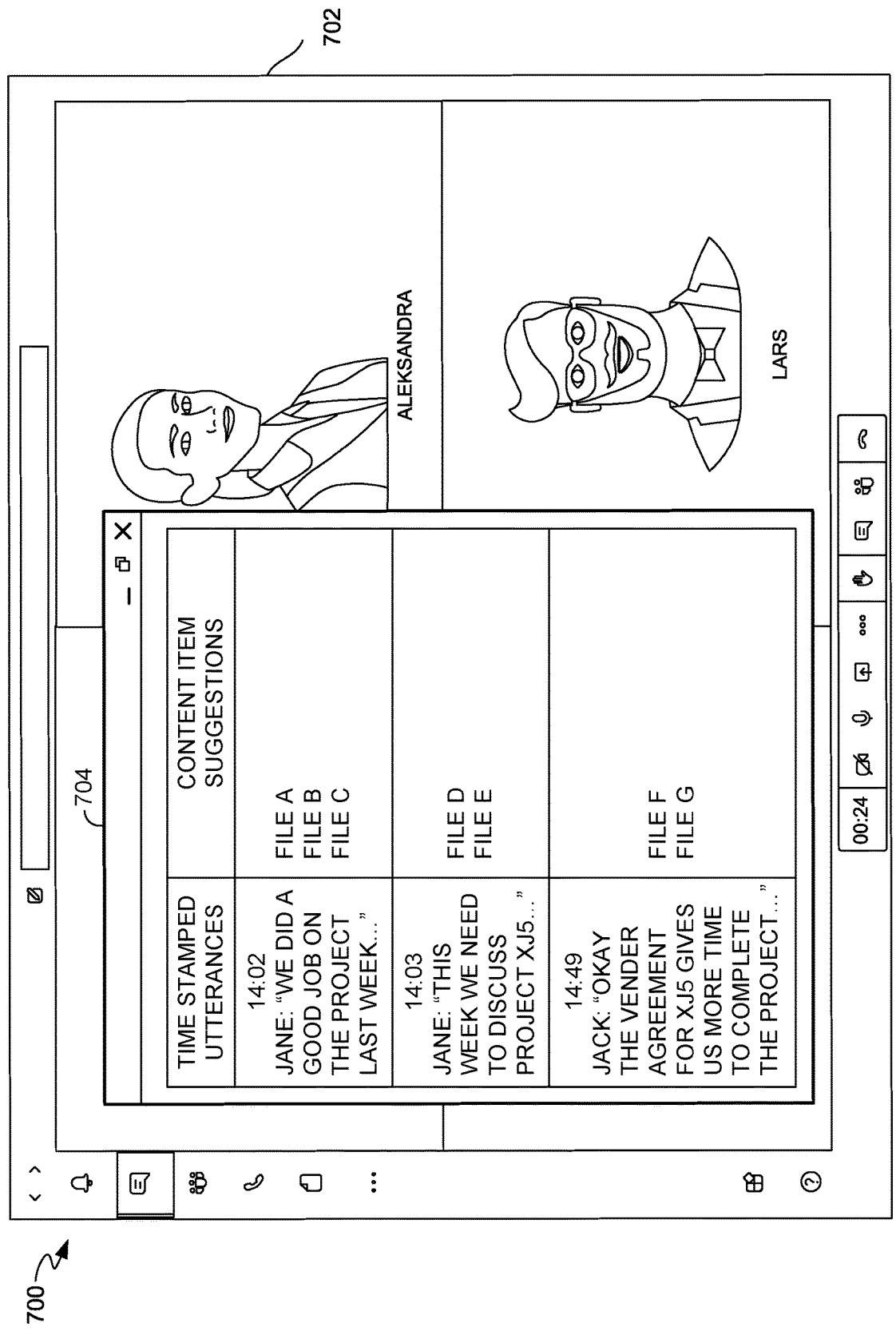
FIG. 7 is an example screenshot illustrating presentation of multiple indications of content items according to specific time-stamped natural language utterances spoken, according to some embodiments.

Turning now to FIG. 7, an example screenshot 700 illustrating presentation of multiple indications of content items according to specific time-stamped natural language utterances spoken, according to some embodiments. In some embodiments, the presentation of the indications of content items represent the output of the system 200 of FIG. 2, the content item ranking model/layer 315 of FIG. 3, and/or the inference prediction(s) 409 of FIG. 4. For example, for time-stamped natural language utterance 14:02, File A, File B, and File C represent what is selected or ranked by the content item producer 260 of FIG. 2. In some embodiments, the screenshot 700 represents a page or other instance of a consumer application, where users can collaborate and communicate with each other (for example, via instant chat, video conferencing, and/or the like).

FIG. 7 illustrates that content items are caused to be presented, in a meeting, in near real-time relative to each natural language utterance (or the detection of such utterance), when the intent of such utterance is to produce one or more content items. Toast 704 accordingly indicates several time-stamped natural language utterances and corresponding content items (also referred to as content item suggestions). In some embodiments, natural language utterances are not mapped to or otherwise associated to specific content item suggestions, as illustrated in the toast 704, when the intent is not to reference or surface any content item. For example, this may be the reason for the large gap in time between 14:03 and 14:49, as an attendee may have talked about personal matters, such as picking up a kid after work, a ball game, or something else unrelated to the meeting or any particular content item. In this way, some embodiments filter out natural language utterance from the toast 704 where the intent (as determined by the speaker intent model/layer 313) is not to produce a content item.

At a first time 14:02 Jane utters "we did a good job on the project last week . . . " In some embodiments, in response to such natural language utterance, the natural language utterance detector 257 detects the natural language utterance 620. In some embodiments, in response to the detection of the natural language utterance, various functionality automatically occurs as described herein, such as the functionality as described with respect to one or more components of the content item producer 260, the text producing model/layer 311, the speaker intent model/layer 313, the content item ranking model/layer 315, the neural network 405, and/or a walk of the network graph 500 in order to rank content items. In response to determining that File A, File B, and File C are the most relevant to present, the presentation component 220 automatically causes presentation, during the meeting, of File A, File B, and File C. In some embodiments, the positioning of the content item within the screenshot 704 indicates the particular rank of the content item. For example, File A may be ranked the highest and therefore be presented as the top-most content item. File B may be ranked second highest or have the second highest score and is therefore presented directly underneath File A. And File C may be ranked last (or the last ranked most relevant content item) and therefore be presented directly under File B. This same process occurs with respect to the additional natural language utterances corresponding to time stamp 14:04 and 14:49—for 14:49. the most relevant content items may be File D and File E and for time stamp 14:49, the most relevant content items may be File F and File G.

Figure 8:
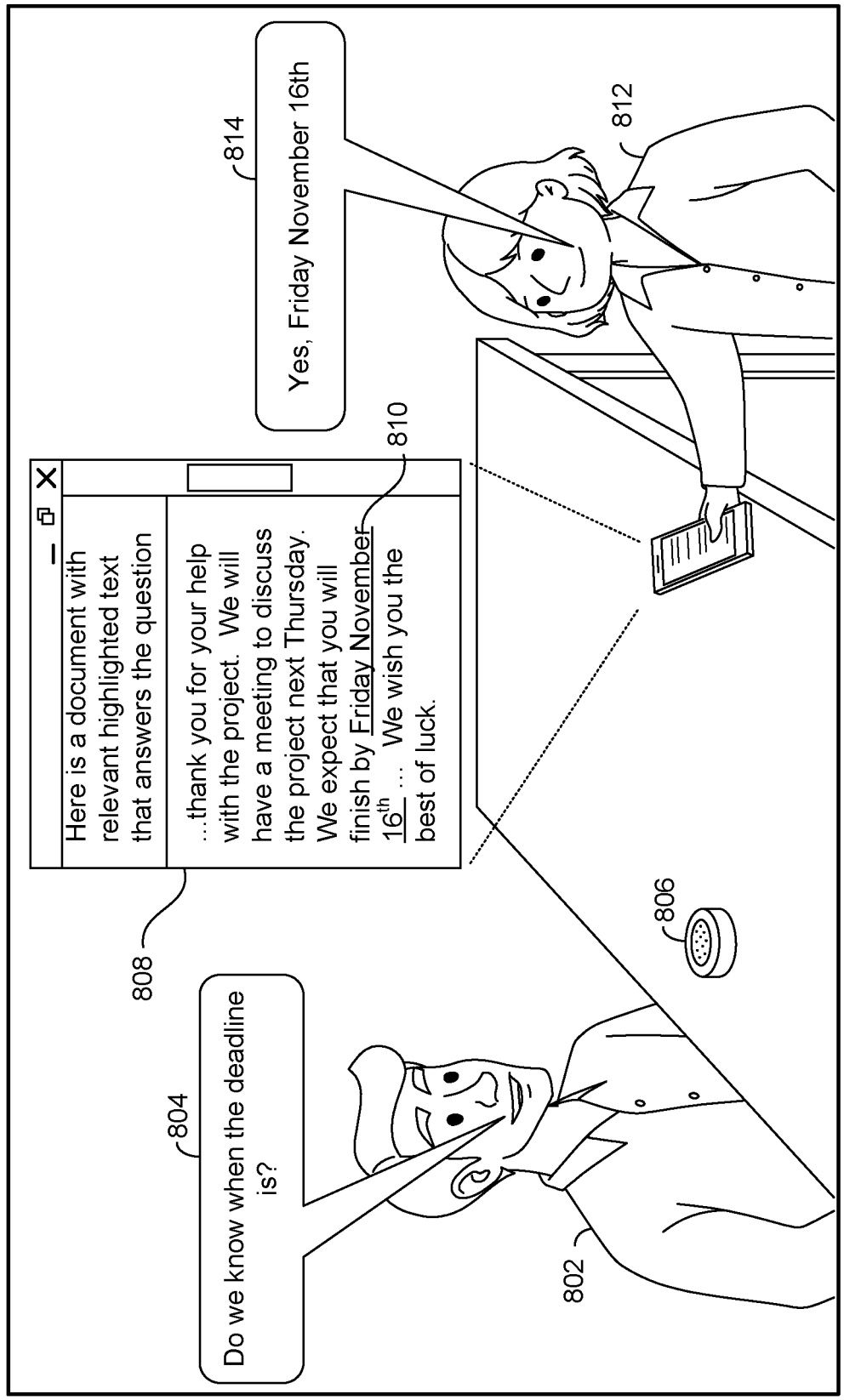
FIG. 8 a schematic diagram illustrating a real world meeting environment as well as the highlighting of relevant portions of a content item, according to some embodiments.

Turning now to FIG. 8, a schematic diagram illustrating a real world meeting environment as well as the highlighting of relevant portions of a content item, according to some embodiments. In some embodiments, the presentation of the content item 808, including the highlight 810, represents the output of the system 200 of FIG. 2, the content item ranking model/layer 315 of FIG. 3, and/or the inference prediction(s) 409 of FIG. 4. In some embodiments, the environment within FIG. 8 illustrates a real world room or other geographical area (as opposed to a video conferencing or meeting application as illustrated in FIG. 6 and FIG. 7) that includes real world meeting attendees 802 and 804.

At a first time, the virtual assistant device 806 (such as a smart speaker and/or a microphone) receives audio signals corresponding to the natural language utterance 804—"do we know when the deadline is?" In response to the virtual assistant device 806 receiving the natural language utterance 804, the virtual assistant device 806 causes a transmission, over the network(s) 110, of the natural language utterance 804, to another computing device, such as a server, and the natural language utterance detector 257 detects the natural language utterance 804. In some embodiments, in response to the detection of the natural language utterance 804, various functionality automatically occurs as described herein, such as the functionality as described with respect to one or more components of the content item producer 260, the text producing model/layer 311, the speaker intent model/layer 313, the content item ranking model/layer 315, the neural network 405, and/or a walk of the network graph 500 in order to rank content items.

In response to determining that document 808 is the most relevant to present, the presentation component 220 automatically causes presentation, during the meeting, of document 808, along with highlighted text 810, which is directly relevant for answering the question indicated in the utterance 804. In this way, the attendee 812 can quickly view the highlighted text 810 to answer the question via the utterance 814. This has utility in that the attendee 812 does not have to manually search for, open, and/or scroll within the document 808 for relevant information, which would be costly since the attendee 812 may be expected to quickly find or know this information. For example, the document 808 may be 20 pages long and so manually scrolling or drilling would be unproductive or waste valuable time.

Highlighting refers underlining, changing font, changing color, and/or otherwise changing the appearance of certain text relative to other text in the content item. Some embodiments use natural language modeling and/or string matching algorithms in order to detect where to place the highlights. For example, some embodiments detect that the intent of the utterance 804 is to find a document that indicates what the deadline is for a specific project X, as indicated in prior emails, with attached documents, associated with the meeting. In response to the correct document being found, a encoder, transformer, or other BERT component may cause a computer read of the text within the document 808 to search for semantically similar text relative to the utterance 804 (for example, "deadline" is semantically similar to "finish," as well as key words or key word formats (based on using syntactic rules or component), such as a date (Friday November 16th). In some embodiments, such as described with respect to the neural network 505 of FIG. 5, a model is trained to understand what to look for in a document for highlighting.

Figure 9A:
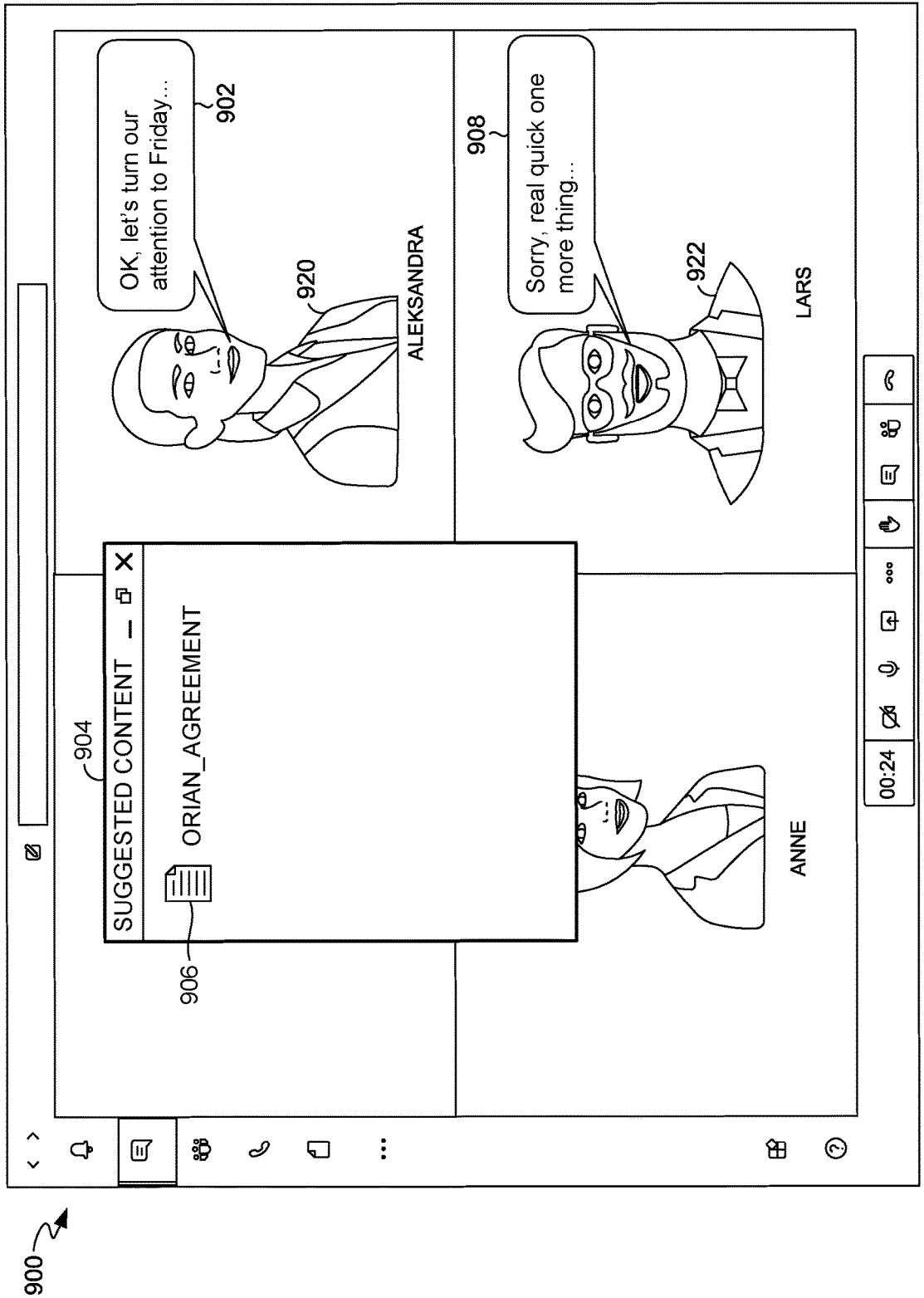
FIG. 9A is an example screenshot illustrating a zero-query presentation of an indication (a link and filename) of a content item (a file), according to some embodiments.

Turning now to FIG. 9A, an example screenshot 900 illustrating a zero-query presentation of an indication 906 (a link and filename) of a content item (a file), according to some embodiments. In some embodiments, the presentation of the indication 906 represents the output of the system 200 of FIG. 2, the content item ranking model/layer 315 of FIG. 3, and/or the inference prediction(s) 409 of FIG. 4. In some embodiments, the screenshot 900 represents a page or other instance of a consumer application, where users can collaborate and communicate with each other (for example, via instant chat, video conferencing, and/or the like).

At a first time, attendee 920 makes a natural language utterance 902—"ok, let's turn our attention to Friday . . ." In some embodiments, in response to such natural language utterance, 902, the natural language utterance detector 257 detects the natural language utterance 902. In some embodiments, in response to the detection of the natural language utterance 902, various functionality automatically occurs as described herein, such as the functionality as described with respect to one or more components of the content item producer 260, the text producing model/layer 311, the speaker intent model/layer 313, the content item ranking model/layer 315, the neural network 405, and/or a walk of the network graph 500 in order to rank content items.

As illustrated in the natural language utterance 902, it may be unclear what will be discussed on Friday from the utterance alone. Moreover, there is no explicit query or other request to surface any document. Further, the natural language utterance 908 indicates that the participant 922 is cutting off or otherwise says something to cause the natural language utterance 902 to be incomplete such that attendees may not understand what the importance of Friday is. However, in some embodiments, the speaker intent model/layer 313 determines that the implicit intent of the natural language utterance 902 is to discuss a particular ORIAN deal that is to be closed based on meeting context or user context (finding a document attached to a meeting that discusses the OMAN deal closing on Friday). In other words, embodiments can determine whatever an attendee is about to talk about (or will talk about in the future) even though they do not explicitly reference it in the natural language utterance or query. Some embodiments therefore use context of user's meetings, emails, files, and/or near real-time natural language utterances to create zero-query suggestion content items, such as the indication 906 to the OMAN agreement, as indicated in the window 904. In response to determining that the content item associated with the indication 906 is most relevant for the natural language utterance 902, the presentation component 220 automatically causes presentation, during the meeting, of the indication 906.

Figure 9B:
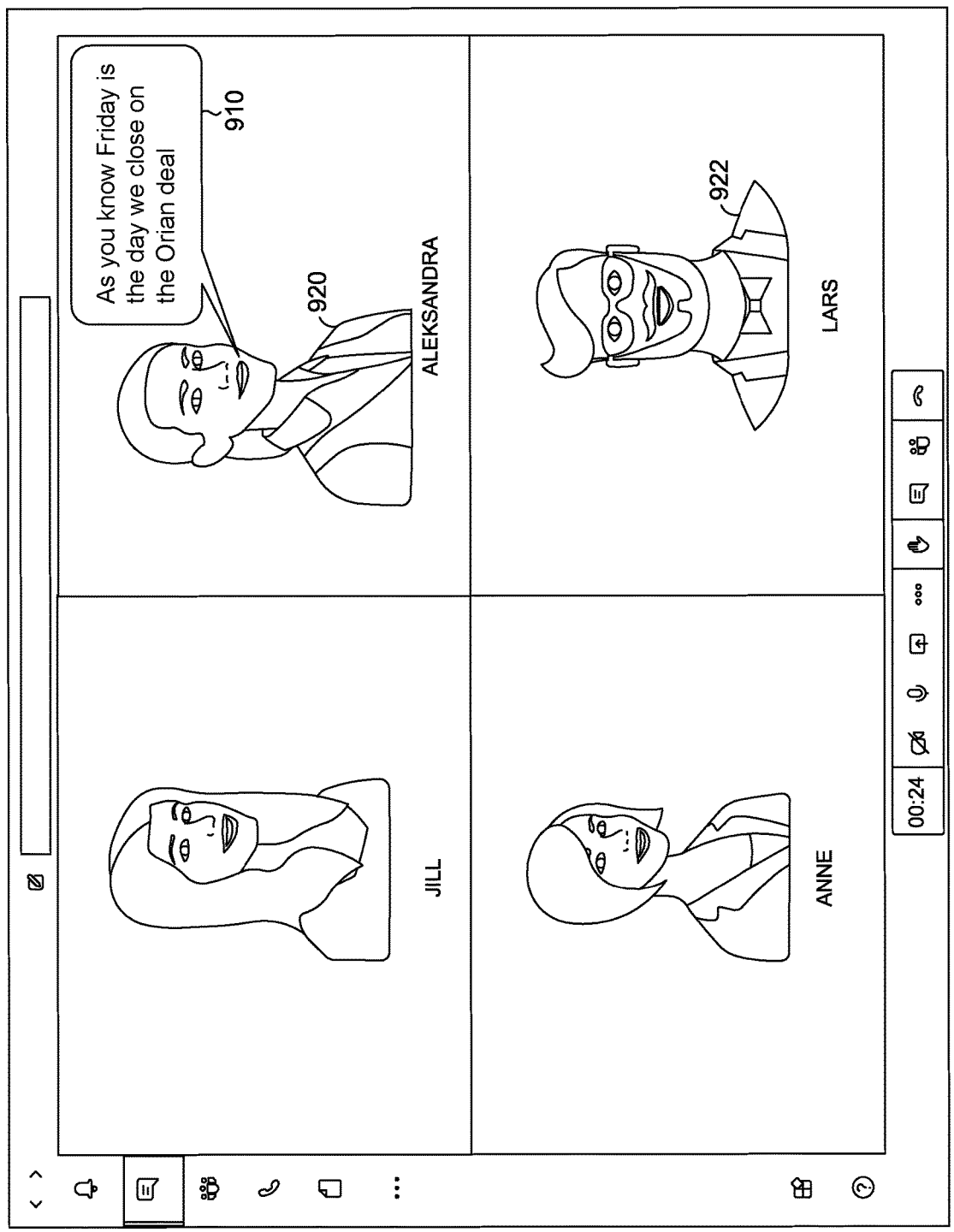
FIG. 9B is a screenshot that represents a completion of a natural language utterance of FIG. 9A, according to some embodiments.

FIG. 9B is a screenshot that represents a completion of the natural language utterance 902 of FIG. 9A, according to some embodiments. FIG. 9B thus illustrates a point in time in a meeting subsequent to the point in time of FIG. 9A. Accordingly, the attendee 920 may utter "as you know, Friday is the day we close on the ORIAN deal," as indicated in 910. As illustrated by what is included in the indication 906 ("ORIAN_Agreement") in FIG. 9A, however, particular embodiments already determined the intent and already caused presentation of the relevant indication 906 before the natural language utterance 910 of FIG. 9B was made. Therefore, particular embodiments make zero-query content item suggestions to users.

Figure 10:
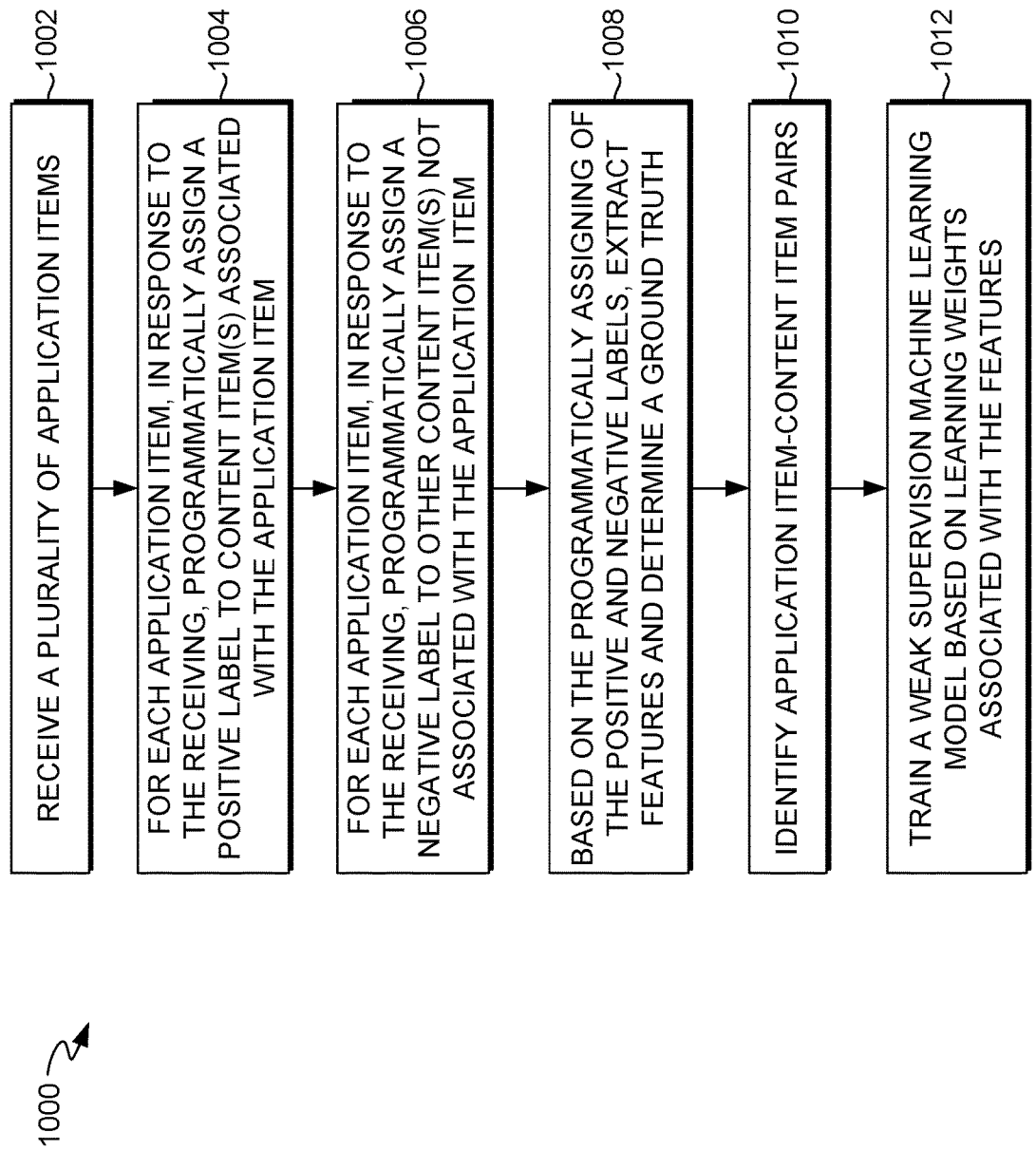
FIG. 10 is a flow diagram of an example process for training a weak supervision machine learning model, according to some embodiments.

FIG. 10 is a flow diagram of an example process 1000 for training a weak supervision machine learning model, according to some embodiments. The process 1000 (and/or any of the functionality described herein, such as 1100 and 12000) may be performed by processing logic that comprises hardware (for example, circuitry, dedicated logic, programmable logic, microcode, etc.), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIG. 1 through FIG. 13). The computer-implemented method, the system (that includes at least one computing device having at least one processor and at least one computer readable storage medium), and/or the computer readable medium as described herein may perform or be caused to perform the process 1000 or any other functionality described herein.

In some embodiments, the process 1000 represents the training of the neural network 405 of FIG. 4 via the training data inputs 415 and the training predictions 507. Per block 1002, various embodiments receive a plurality of application items. An "application item" as described herein refers to any suitable unit of information, application process(es), and/or application routine(s) associated with an application. For example, an application item can be or include a calendaring item of a personal information manager application (such as OUTLOOK), a video conferencing session or event (such as a specific meeting in MICROSOFT TEAMS) where users engage in natural language utterance audio exchange and can visually see each other, a chat session of a chat application, or the like. Each video conferencing session or event can therefore include a plurality of recorded and natural language utterances and/or video recording of the video conferencing session or event.

A "calendaring item" as described herein refers to any portion of an application workflow (such as a subset of program processes or routines) that allow users to schedule tasks, plan meetings, set reminders for upcoming events, schedule meetings, send email notifications to meeting attendees, or the like. For example, a calendaring item can include a meeting invite, which can be an email sent to meeting invitees to invite them to a meeting. Such emails can often include attachment of other content items, such as files that will be discussed in a corresponding meeting.

Per block 1004, in response to the receiving of the plurality of application items, for each application item, of the plurality of application items, some embodiments programmatically assign (without a human annotator) a positive label to one or more content items associated with the application item. A content item that is "associated" with a particular application item refers to a content item attached to an application item (such as a file attached a meeting invite email), a content item shared or referenced in a meeting or other video conferencing event, a content item that has been mapped to a particular application item (such as a network graph, where a first node represents a meeting and a second set of nodes within a threshold distance represent various content items associated with the meeting), a content item shared in a chat session, or any other content item referenced by users of an application. In an illustrative example of block 1004, some embodiments assign a positive label to each file attached to a meeting invite or other calendaring item for a specific meeting.

Per block 1006, in response to the receiving of the plurality of application items, for each application item, some embodiments programmatically assign (without a human annotator) a negative label to one or more other content items not associated with the application item. A content item that is "not associated" with a particular application item refers to a content item not attached to an application item, a content item never shared or referenced in a meeting or other video conferencing event, a content item that has not been mapped to a particular application item, a content item not shared in a chat session, or any other content item not referenced by users of an application. For example, using the illustration above with respect to block 1004, some embodiments assign a negative label to each file not attached to the meeting invite or other calendaring item for the specific meeting. In other words, these embodiments determine a pool of content items that could have been attached to the meeting invite but were never attached by any users.

Per block 1008, based on the programmatic assigning of the positive and negative labels, particular embodiments extract features and determine a ground truth. In an illustrative example, particular embodiments receive various historical meeting invites associated with various meetings or meeting types, each with the positive or negative labels indicating the specific content items attached to the meeting invites. Responsively, particular embodiments convert or encode such labeled data into one or more feature vectors so that the features of the data are represented for the specific labels, which represents the ground truth.

Per block 1010, some embodiments identify application item-content item pairs. In other words, each application item, of the plurality of application items, is paired with corresponding or associated content items and/or non-corresponding or non-associated content items. For example, a meeting invite may be paired with each file ever attached to the meeting invite as one application-item-content pair. Additionally or alternatively, the meeting invite may be paired with each file that was never attached to the meeting invite as another application-item-content item pair.

Per block 1012, some embodiments train a weak supervision machine learning model based on learning weights associated with the features. In other words, the machine learning model takes as input, the pairs identified at block 1010 and determines patterns associated with each pair to ultimately learn an embedding or the specific features for a given set of content items and application items representing the ground truth. In this way, the model learns which features are present and not present for the given ground truth over multiple iterations or epochs. And in this way, embodiments learn which content items are associated with a given application item based on the labels. Training predictions can be continuously made until a loss function is acceptable with respect to the ground truth so that each appropriate node weight or node pathway of a neural network is appropriately activated or not activated, as described with respect to FIG. 4.

Figure 11:
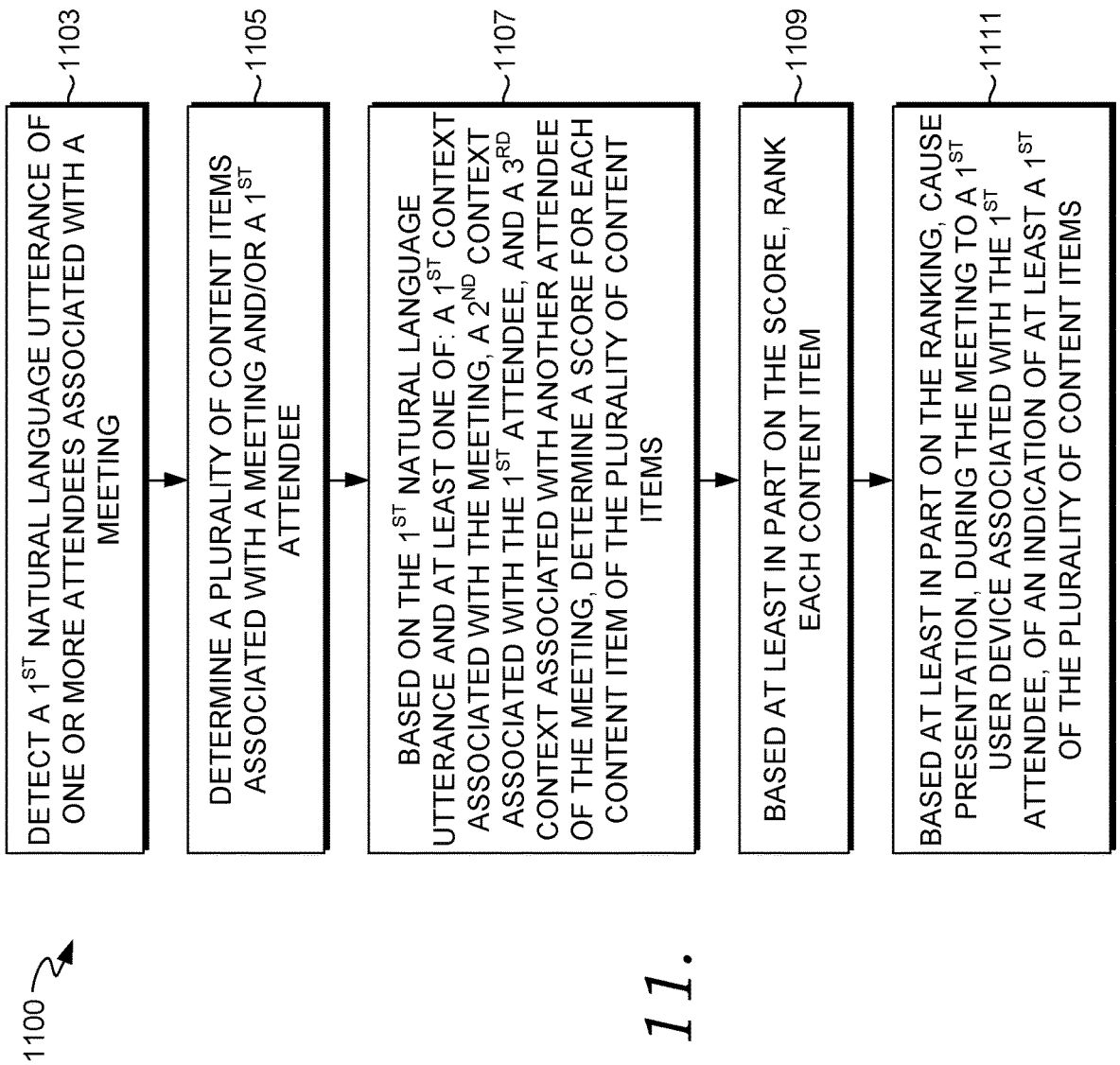
FIG. 11 is a flow diagram of an example process for causing presentation of an indication of a content item based at least in part on a natural language utterance of a meeting, according to some embodiments.

FIG. 11 is a flow diagram of an example process 1100 for causing presentation of an indication of a content item based at least in part on a natural language utterance of a meeting, according to some embodiments. Per block 1103, some embodiments detect a first natural language utterance of one or more attendees associated with a meeting. Examples and more specific details are described with respect to the natural language utterance detector 257 of FIG. 2 and the text producing model/layer 311 of FIG. 3. In some embodiments, the first natural language utterance is among a plurality of natural language utterances associated with a meeting. For example, a video conference meeting may include a recording (an audio file) that stores each natural language utterance of various attendees for a duration of the meeting.

In some embodiments, the detecting of the first natural language utterance includes encoding audio speech to first text data at a transcript document (such as described with respect to the meeting content assembler 256) and performing natural language processing of the first text data to determine the first natural language utterance. More details and examples of this are described with respect to the text producing model/layer 311 of FIG. 3, which can encode the audio data 305 into an output document. In other embodiments, detecting a natural language utterance can include reading a data object (such as a chat page) and parsing, tokenizing, and tagging (via POS tags) natural language text via natural language processing. In some embodiments, the transcript document includes second text data that indicates the plurality of natural language utterances, and the transcript document further includes a plurality of name identifiers, where each name identifier indicates a particular attendee that uttered a respective natural language utterance, of the plurality of natural language utterances.

Per block 1105, some embodiments determine a plurality of content items associated with a meeting and/or a first attendee (such as an attendee whose device will be presented with the indication of the content item at block 1111). In some embodiments, the plurality of content items exclude the plurality of natural language utterances. In some embodiments such exclusion means that a content item does not refer to any of the other natural language utterances that occur in the meeting for which the first natural language utterance has been detected. For example, the meeting may include utterances from John, Jane, and Mary. The actual speech or audio data from these attendees is not a content item.

In some embodiments, each content item is a candidate for presentation, during the meeting, to a user device associated with the first attendee. In some embodiments, a content item being a candidate for presentation also includes an indication (such as a link) of the content item. In this way, the indication is a candidate for presentation instead of the content item itself. Similarly, in some embodiments a content item is still considered a candidate for presentation even if indications (such as a link or filename) is actually presented to a user instead of the actual content item because the user can still access the content item from the indication.

In some embodiments, the determining of the plurality of content items at block 1105 includes performing a computer read of a network graph associated with the first attendee and selecting the plurality of content items among other content items (such as a larger pool of content items), where a first node of the network graph represents the meeting, a second set of nodes of the network graph represents at least one of: a respective content item, of the plurality of content items and the other content items, the first attendee, and another attendee associated with the meeting. Examples and more details of this are described with respect to the network graph 500 of FIG. 5. For example, embodiments can select the N closest nodes representing content items (in terms of edge distance) from a node representing the meeting.

In some embodiments, the plurality of content items include one or more of: a data file (also referred to herein as a "file") or a message. For example, the plurality of content items can include a plurality of data files, a plurality of message, and/or a combination of different data files and messages. A "data file" is a data object (such as a container) that stores data. For example, the file can be an image file (such as a digital photograph), a document file (such as a WORD or PDF document), any email attachment, or the like. A "message" can refer to one or more natural language words or characters, which excludes each natural language utterance of the meeting. For example, a message can be a chat message phrase input by a specific user in a chat session. In some embodiments, a message includes a notification, such as useful information for an attendee, such as "the project John is currently talking about, has a due date of 11/16." In some embodiments, a message includes an email. An email (or other message) can refer to a file that includes a received or sent email in the format of an email application. Alternatively or additionally, an email can refer to copied text from the email that is in an altered format relative to the email application (such as copying each word in the email to a pop-up window without to/from functionality or other features). In some embodiments, each of the content items are pre-existing or have already been generated before the detecting of the first natural language utterance (such as the email having been already sent and received).

Per block 1107, some embodiments determine (such as generate) a score for each content item, of the plurality of content items, based on the first natural language utterance and at least one of: a first context associated with the meeting (such as the meeting context 309), a second context associated with the first attendee (such as described in the user context 303), and/or a third context associated with another attendee of the meeting (such as described in the user context 303). Examples of the determining of the score per block 1107 are described with respect to the content item ranker 264 of FIG. 2, the content item ranking model/layer 315 of FIG. 3, and/or the inference prediction(s) 409 of FIG. 4. In alternative embodiments, however, such score is determined based on the first natural language utterance, the first context, the second context, and/or the third context—that is, a score can be generated without respect to the detected natural language utterance.

In an illustrative example of block 1107, some embodiments first determine an intent of the first natural language utterance via natural language processing (as described with respect to the speaker intent model/layer 313) based on meeting context and/or user context. Some embodiments responsively determine that the intent is to reference (or otherwise associated) with a specific content item. Then particular embodiments rank each content item based on the first natural language utterance, meeting context and/or user context (as described with respect to the content item ranking model/layer 315). For example, a highest ranking content item can be one the specific content item indicated in the intent.

In some embodiments, the generating (or determining) of the score for each content item includes predicting, via a weak supervision machine learning model, that the first content item is a most relevant content item relative to other content items. Examples of this are described with respect to the neural network 405 of FIG. 5. In some embodiments, the predicting is based on concatenating one or more of the following into a feature vector, which is used as an input to the weak supervision machine learning model, a first identifier that identifies the first attendee, the first natural language utterance, a second set of identifiers that each identify a respective attendee of the meeting, and a third identifier that identifies the meeting. Examples of the same, additional, or alternative inputs (such as the intent) is described with respect to the deployment input(s) 403 and/or the training input(s) 415 of FIG. 4.

In some embodiments, the determined score at block 1107 is based on training the weak supervision model by programmatically assigning, without a human annotator, a first label (such as a positive label) to each content item that is associated with (such as explicitly referenced or attached to) an application item and assigning a second label (such as a negative label) to each content item that is not associated with (such as not explicitly referenced or attached to) the calendaring item and learning which content items are associated with the application item based on the first label and the second label. In some embodiments, these steps include the process 1000 as described with respect to FIG. 10 for training a machine learning model.

Per block 1109, based at least in part on the score, some embodiments rank each content item of the plurality of content items. In some embodiments, such ranking includes the functionality as described with respect to the content item ranking model/layer 315 and/or the content item ranker 264.

Per block 1111, some embodiments cause presentation, during the meeting and to a first user device associated with the first attendee, of an indication of at least a first content item, of the plurality of content items, based at least in part on the ranking at block 1109. In some embodiments, however, such causing presentation is based at least in part on the scoring (block 1107) alternative or in addition to the ranking. An "indication" in the context of block 1111 in some embodiments refers to a link (such as a hyperlink that references a document or is otherwise selectable to open a document), a filename (such as a name is saved as), a content item itself, a hash, or other data that represents or is associated with a content item. For example, the indication can be a link to a file. Examples of block 1111 are described with respect to the presenting of the link 606 of FIG. 6, the presenting of the content item suggestions in the toast 704 (such as File A, File B, and File C), the presenting of the document 808 of FIG. 8, and the presenting of the link and filename 906.

In some embodiments, such causing presentation includes causing presentation of a document with highlighted characters, where the highlighting of the characters being based at least in part on the first natural language utterance. In some embodiments, this functionality represents or includes the functionality as described with respect to FIG. 8, where the highlighted text 810 is presented.

In some embodiments, the causing presentation includes causing presentation of an indication of a file (or other content item) and selectively refraining from causing presentation of indications of other files (or content items). In some embodiments, such selective refraining is based on a content item being below scoring (such as a confidence level) or ranking threshold. For example, referring back to FIG. 7, for the natural language utterance at time stamp 14:02, only file A may be presented, and not file B and C because they fail to exceed a particular scoring threshold (such as 80% confidence level of being relevant).

In some embodiments, for the same first natural language utterance and the same meeting as described with respect to the process 1100 of FIG. 11, different content items may be determined and scored for a different attendee (and/or other attendees) of the meeting. In this way, each presented content item is personalized for specific attendees of a meeting. For instance, some embodiments determine a second plurality of content items associated with a second attendee of the meeting, where each content item is also a candidate for presentation, during the meeting, to a second user device associated with the second attendee. Based at least in part on the first natural language utterance and another context associated with the second attendee, some embodiments generate a second score for each content item of the second plurality of content items. And based at least in part on the second score, some embodiments rank each content item of the second plurality of content items. Based at least in part on the ranking of each content item of the second plurality of content items, particular embodiments cause presentation, during the meeting and to the second user device, of another indication of at least a second content item of the plurality of content items.

In an illustrative example, a speaker of a meeting may reference sales numbers. Responsively particular embodiments caused presentation, at the first user device, of a first email that the first attendee sent, and simultaneously cause presentation, at the second user device, of a second email that the second attendee sent, where both emails describe or references the sales numbers indicated by the speaker but because both emails are private data, they are sent to the respective attendees only. In other words, for example, some embodiments refrain from causing presentation of the first content item to the second user device based on the second attendee not having access rights to the first content item.

In some embodiments, subsequent to the presentation via block 1111, some embodiments receive, via the first user device, a request for the first attendee to share the first content item to the second attended. For example, referring back to FIG. 6, some embodiments receive an indication that the first attendee has selected the YES button 607 in the prompt whether the first attendee would "like to share the email with the group." In response to the receiving of this request, some embodiments cause presentation of the first content item to a second user device associated with the second attendee, as described, for example, with respect to FIG. 6.

Some embodiments additionally cause presentation, prior to the meeting, of a second content item based at least in part on the context associated with the meeting (and/or a context associated with one or more attendees), where plurality of content items include at least one of a pre-read document or an agenda document, as described, for example with respect to the content item generator 261 of FIG. 2.

Figure 12:
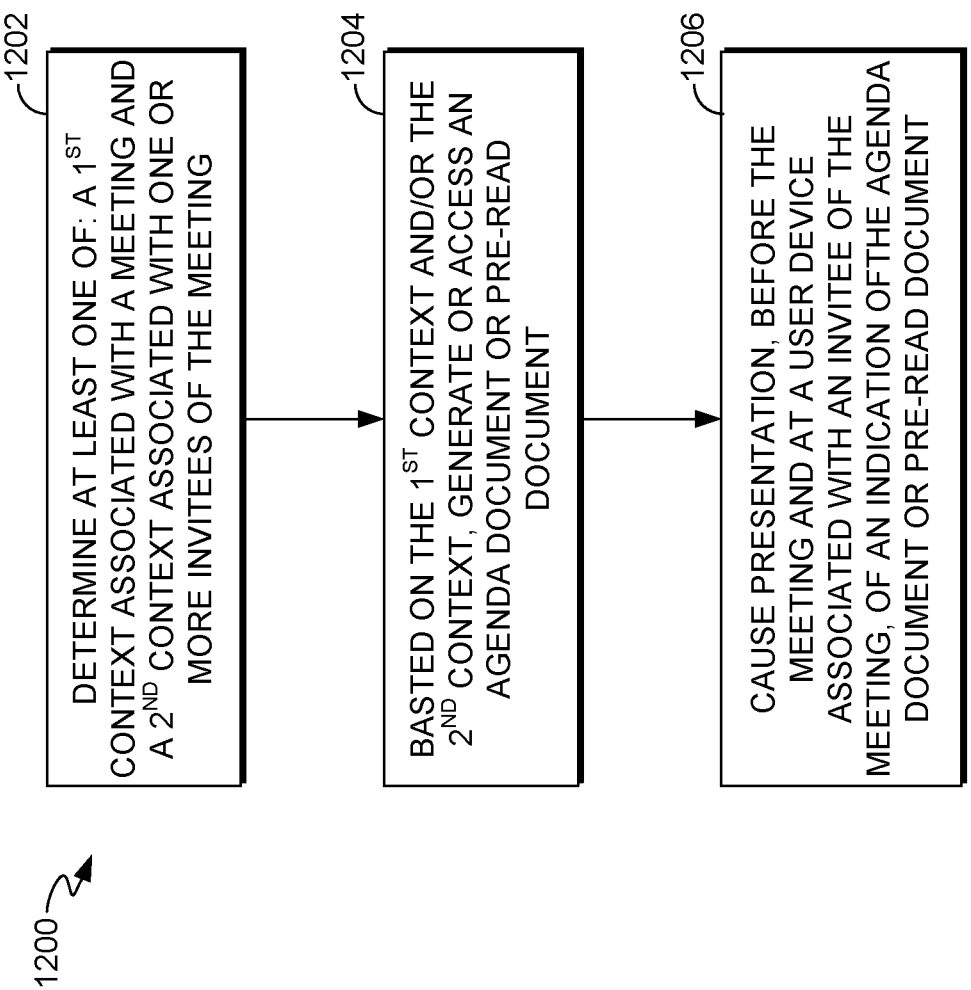
FIG. 12 is a flow diagram of an example process for presenting an indication of an agenda document or pre-read document before a meeting, according to some embodiments.

FIG. 12 is a flow diagram of an example process 1200 for presenting an indication of an agenda document or pre-read document before a meeting, according to some embodiments. Per block 1202, some embodiments determine at least one of: a first context associated with a meeting and a second context associated with one or more invitees of the meeting. In some embodiments, the first context includes functionality and data as described with respect to the meeting context 309 of FIG. 3, the meeting profile 270, and/or the meeting monitor 250 of FIG. 2. In some embodiments, the second context includes functionality and data as described with respect to the user context 303 of FIG. 3, the user profile 240, and/or the user-data collection component 210 of FIG. 2.

Per block 1204, based on the first context and/or the second context, some embodiments generate or access an agenda document or a pre-read document. In some embodiments, such "generation" of the documents includes the functionality as described with respect to the content item generator 261. In some embodiments, such "access" of the documents includes accessing, from data storage (such as RAM or disk), a data record (such as a database record) that includes the document. In these embodiments, the documents have already been generated and stored in computer storage and are accessed, for example, in response to block 1202.

Per block 1206, some embodiments cause presentation, before the meeting begins and at a user device associated with an invitee of the meeting, of an indication of the agenda document or pre-read document. In some embodiments, the timing of such presentation of the document before the meeting begins is based on one or more predetermined rules or policies, such as 10 minutes before the meeting starts or 5 minutes before the meeting starts, where the start time of the meeting is derived from the meeting context (such as meeting context 309).

Other Embodiments

Accordingly, described herein are various aspects of technology directed to systems and methods for near real-time in-meeting content item suggestions. It is understood that various features, sub-combinations, and modifications of the embodiments described herein are of utility and may be employed in other embodiments without reference to other features or sub-combinations. Moreover, the order and sequences of steps shown in the example flow diagrams are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises at least one processor, and one or more computer storage media storing computer-useable instructions that, when used by the at least one computer processor, cause the at least one computer processor to perform operations. The operations comprise detecting a first natural language utterance associated with one or more attendees of a meeting, the one or more attendees including a first attendee, the first natural language utterance being among a plurality of natural language utterances associated with the meeting; determining a plurality of content items associated with the first attendee, the plurality of content items excluding the plurality of natural language utterances, each content item, of the plurality of content items, being associated with a candidate for presentation, during the meeting, to a user device associated with the first attendee; based at least in part on the first natural language utterance and at least one of: a first context associated with the meeting and a second context associated with the first attendee, generating a score for each content item of the plurality of content items; based at least in part on the score, ranking each content item of the plurality of content items; and during the meeting and based at least in part on the ranking, causing presentation, to the first user device associated with the first attendee, of an indication of at least a first content item of the plurality of content items at least partially responsive to the detecting of the first natural language utterance.

Advantageously, these and other embodiments, as described herein improve existing technologies because scoring and presentation can be based on factors such as real-time natural language utterances in a meeting and/or other contexts, such as meeting topic or attendee ID. Instead of requiring an explicit user query or other user activity (such as clicks) to manually search for or surface content items, particular embodiments automatically provide such content items based on unique rules or factors (for instance, providing content items that match natural language utterances of meetings, or providing content items based on users downloading those content items as attachments in previous emails). The generated score alone is a technical solution to these problems because the most relevant content items are surfaced. When the meeting starts or when users start talking about a particular file, particular embodiments will automatically cause presentation of an indication (such as a link) to the particular file based on the scoring, instead of requiring the user to manually retrieve the particular file in an email application via a search query. Such presentation is an additional technical solution in and of itself to these technical problems.

Moreover, these and other embodiments, as described herein improve existing technologies because of the improvement of user interfaces and human-computer interaction by automatically causing presentation of indications of content items during a meeting, thereby negating the requirement for users having to arduously drill down various pages to find the appropriate file, or issue a query. Moreover, these and other embodiments, as described herein improve existing technologies by intelligently and automatically causing presentation of indications of content items or generating content items to users before a meeting starts in order to decrease storage device I/O because particular embodiments perform a single write (or fewer writes) to a storage device to generate the document, as opposed to repeatedly storing or writing manual user inputs to a storage device, as is required with existing technologies.

Moreover, these and other embodiments improve computer information security and user privacy relative to existing technologies by using weak supervision models to programmatically assign, without a human annotator, particular labels. In this way, no human annotators can view or steal private data, such as credit card information, phone numbers, and the like. Moreover, some embodiments encrypt such personal information so that no other remote user can access this information. Further, particular embodiments improve security and user privacy by incorporating access control mechanisms to keep users from accessing content items they are not supposed to access. For example, during a meeting, particular embodiments only cause presentation to a user device associated with a user of a content item but refrain from causing presentation of the content item to a second attendee based on the second attendee not having access rights to the content item. One of the access control mechanisms that improve existing technologies is the concept of causing presentation of indications of content items to users in response to receiving a user request from a user that has access to those content items to share such content items.

Moreover, these and other embodiments also improve other computing resource consumption, such as network bandwidth, network latency, and I/O when searching for content items by determining a plurality of content items associated with a first attendee or meeting (or determining that the content items are in fact associated with the first attendee or meeting) that are candidates for presentation during a meeting. Instead of walking entire decision trees or other data structures when determining content items, particular embodiments can determine that a subset of content items are likely to be relevant for a meeting or particular attendee. This reduces storage device I/O because the storage device is accessed fewer times to perform read/write operations, which wears less on the read/write head. Moreover, because fewer data sources, nodes, or content items are considered, this decreases network latency and reduces bandwidth.

In any combination of the above embodiments, the detecting of the first natural language utterance includes encoding audio speech to first text data at a transcript document and performing natural language processing of the first text data to determine the first natural language utterance.

In any combination of the above embodiments of the computerized system, the determining of plurality of content items associated with the first attendee includes performing a computer read of a network graph associated with the first attendee and selecting the plurality of content items among other content items, a first node of the network graph representing the meeting, a second set of nodes of the network graph representing at least one of: a respective content item, of the plurality of content items and the other content items, the first attendee, and another attendee associated with the meeting.

In any combination of the above embodiments of the computerized system, the plurality of content items includes one or more of a data file or a message, and wherein the presented indication includes a link to the data file or a link to the message.

In any combination of the above embodiments of the computerized system, the generating of the score for each content item includes predicting, via a weak supervision machine learning model, that the first content item is a most relevant content item relative to other content items of the plurality of content items.

In any combination of the above embodiments of the computerized system, the predicting includes concatenating one or more of the following into a feature vector to be used as input to the weak supervision machine learning model: a first identifier that identifies the first attendee, the first natural language utterance, a second set of identifiers that each identify a respective attendee of the meeting, and a third identifier that identifies the meeting.

In any combination of the above embodiments of the computerized system, the operations further comprise training the weak supervision model by programmatically assigning, without a human annotator, a first label to each content item that is associated with an application item and assigning a second label to each content item that is not associated with the application item and learning which content items are associated with the application item based on the first label and the second label.

In any combination of the above embodiments of the computerized system, the causing presentation includes causing presentation of a document with highlighted characters, the highlighting of the characters being based at least in part on the first natural language utterance.

In any combination of the above embodiments of the computerized system, the causing presentation includes causing presentation of a file or link to the file and selectively refraining from causing presentation of other files or links to the other files, each file of the other files, represents a respective content item, of the plurality of content items, the file representing the first content item.

In any combination of the above embodiments of the computerized system, the operations further comprise: determining a second plurality of content items associated with a second attendee of the meeting, each content item, of the second plurality of content items, being a candidate for presentation, during the meeting, to a second user device associated with the second attendee; based at least in part on the first natural language utterance and another context associated with the second attendee, generating a second score for each content item of the second plurality of content items; based at least in part on the second score, ranking each content item of the second plurality of content items; and based at least in part on the ranking of each content item of the second plurality of content items, causing presentation, during the meeting and to the second user device associated with the second attendee, of another indication of at least a second content item of the plurality of content items.

In any combination of the above embodiments of the computerized system, the operations further comprise refraining from causing presentation of the indication of the first content item to the second user device based on the second attendee not having access rights to the first content item.

In any combination of the above embodiments of the computerized system, the operations further comprise: receiving, via the first user device, a request for the first attendee to share the first content item to a second attendee of the meeting; and in response to the receiving of the request, causing presentation of the first content item to a second user device associated with the second attendee.

In any combination of the above embodiments of the computerized system, the operations further comprise, based at least in part on the context associated with the meeting causing presentation, prior to the meeting, of an indication of a second content item, of the plurality of content items, and wherein the plurality of content items include one or more of a pre-read document and an agenda document associated with the meeting.

In some embodiments, a computer-implemented method, such as the computer-implemented method described in any of the embodiments above, comprises detecting a first natural language utterance of one or more attendees associated with a meeting, the one or more attendees including a first attendee. The computer-implemented may further comprise determining a plurality of content items associated with the meeting. The computer-implemented method may further comprise, based on the first natural language utterance and at least one of: a first context associated with the meeting, a second context associated with the first attendee, and a third context associated with another attendee of the meeting, determining a score for each content item of the plurality of content items. The computer-implemented method may further comprise, based at least in part on the score, ranking each content item of the plurality of content items. The computer-implemented method may further comprise, during the meeting and based at least in part on the ranking, causing presentation, to the first user device associated with the first attendee, of an indication of at least a first content item of the plurality of content items. Advantageously, these and other embodiments, as described herein improve existing technologies because scoring and presentation can be based on factors such as real-time natural language utterances in a meeting and/or other contexts, such as meeting topic or attendee ID. Instead of requiring an explicit user query or other user activity (such as clicks) to manually search for or surface content items, particular embodiments automatically provide such content items based on unique rules or factors (for instance, providing content items that match natural language utterances of meetings, or providing content items based on users downloading those content items as attachments in previous emails). The generated score alone is a technical solution to these problems because the most relevant content items are surfaced. When the meeting starts or when users start talking about a particular file, particular embodiments will automatically cause presentation of an indication (such as a link) to the particular file based on the scoring, instead of requiring the user to manually retrieve the particular file in an email application via a search query. Such presentation is an additional technical solution in and of itself to these technical problems.

Moreover, these and other embodiments, as described herein improve existing technologies because of the improvement of user interfaces and human-computer interaction by automatically causing presentation of indications of content items during a meeting, thereby negating the requirement for users having to arduously drill down various pages to find the appropriate file, or issue a query. Moreover, these and other embodiments, as described herein improve existing technologies by intelligently and automatically causing presentation of indications of content items or generating content items to users before a meeting starts in order to decrease storage device I/O because particular embodiments perform a single write (or fewer writes) to a storage device to generate the document, as opposed to repeatedly storing or writing manual user inputs to a storage device, as is required with existing technologies.

Moreover, these and other embodiments improve computer information security and user privacy relative to existing technologies by the use weak of supervision models to programmatically assign, without a human annotator, particular labels. In this way, no human annotators can view or steal private data, such as credit card information, phone numbers, and the like. Moreover, some embodiments encrypt such personal information so that no other remote user can access this information. Further, particular embodiments improve security and user privacy by incorporating access control mechanisms to keep users from accessing content items they are not supposed to access. For example, during a meeting, particular embodiments only cause presentation to a user device associated with a user of a content item but refrain from causing presentation of the content item to a second attendee based on the second attendee not having access rights to the content item. One of the access control mechanisms that improve existing technologies is the concept of causing presentation of indications of content items to users in response to receiving a user request from a user that has access to those content items to share such content items.

Moreover, these and other embodiments also improve other computing resource consumption, such as network bandwidth, network latency, and I/O when searching for content items by determining a plurality of content items associated with a first attendee or meeting (or determining that the content items are in fact associated with the first attendee or meeting) that are candidates for presentation during a meeting. Instead of walking entire decision trees or other data structures when determining content items, particular embodiments can determine that a subset of content items are likely to be relevant for a meeting or particular attendee. This reduces storage device I/O because the storage device is accessed fewer times to perform read/write operations, which wears less on the read/write head. Moreover, because fewer data sources, nodes, or content items are considered, this decreases network latency and reduces bandwidth.

In any combination of the above embodiments of the computer-implemented method, the causing presentation includes causing presentation, to the first user device during the meeting, of the indication of the first content item and selectively refraining from causing presentation of indications of any other content item, of the plurality of content items.

In any combination of the above embodiments of the computer-implemented method, the method further comprising causing presentation, to the user device before the meeting starts, of a second indication of a second content item, and wherein the second content item including one of a pre-read document and an agenda document.

In any combination of the above embodiments of the computer-implemented method, the generating of the score for each content item includes predicting, via a weak supervision machine learning model, that the first content item is a most relevant content item relative to other content items of the plurality of content items.

In any combination of the above embodiments of the computer-implemented method, the method further comprising: determining a second plurality of content items associated with a second attendee of the meeting, each content item, of the second plurality of content items, being a candidate for presentation to a second user device associated with the second attendee; based at least in part on the first natural language utterance and another context associated with the second attendee, determining a second score for each content item of the second plurality of content items; based at least in part on the second score, ranking each content item of the second plurality of content items; and based at least in part on the ranking of each content item of the second plurality of content items, causing presentation, to the second user device associated with the second attendee, of another indication of at least a second content item of the plurality of content items.

In any combination of the above embodiments of the computer-implemented method, the method further comprising refraining from causing presentation of the indication of the first content item to the second user device based on the second attendee not having access rights to the first content item.

In some embodiments, one or more computer storage media, such as the one or more computer storage media described in any of the embodiments above, comprises computer-executable instructions embodied thereon that, when executed by one or more processors, cause the one or more processors to perform operations comprising: detecting a first natural language utterance of one or more attendees associated with a meeting, the one or more attendees including a first attendee. The operations may further comprise, determining a plurality of content items associated with at least one of: the meeting or first attendee. The operations may further comprise, based at least in part on at least one of: the first natural language utterance, a first context associated with the meeting, a second context associated with the first attendee, and a third context associated with another attendee of the meeting, determining a score for each content item of the plurality of content items. The operations may further comprise, during the meeting and based at least in part on the score, causing presentation, to the first user device associated with the first attendee, of an indication of at least a first content item of the plurality of content items. Advantageously, these and other embodiments, as described herein improve existing technologies because scoring and presentation can be based on factors such as real-time natural language utterances in a meeting and/or other contexts, such as meeting topic or attendee ID. Instead of requiring an explicit user query or other user activity (such as clicks) to manually search for or surface content items, particular embodiments automatically provide such content items based on unique rules or factors (for instance, providing content items that match natural language utterances of meetings, or providing content items based on users downloading those content items as attachments in previous emails). The generated score alone is a technical solution to these problems because the most relevant content items are surfaced. When the meeting starts or when users start talking about a particular file, particular embodiments will automatically cause presentation of an indication (such as a link) to the particular file based on the scoring, instead of requiring the user to manually retrieve the particular file in an email application via a search query. Such presentation is an additional technical solution in and of itself to these technical problems.

Moreover, these and other embodiments, as described herein improve existing technologies because of the improvement of user interfaces and human-computer interaction by automatically causing presentation of indications of content items during a meeting, thereby negating the requirement for users having to arduously drill down various pages to find the appropriate file, or issue a query. Moreover, these and other embodiments, as described herein improve existing technologies by intelligently and automatically causing presentation of indications of content items or generating content items to users before a meeting starts in order to decrease storage device I/O because particular embodiments perform a single write (or fewer writes) to a storage device to generate the document, as opposed to repeatedly storing or writing manual user inputs to a storage device, as is required with existing technologies.

Moreover, these and other embodiments improve computer information security and user privacy relative to existing technologies by the use weak of supervision models to programmatically assign, without a human annotator, particular labels. In this way, no human annotators can view or steal private data, such as credit card information, phone numbers, and the like. Moreover, some embodiments encrypt such personal information so that no other remote user can access this information. Further, particular embodiments improve security and user privacy by incorporating access control mechanisms to keep users from accessing content items they are not supposed to access. For example, during a meeting, particular embodiments only cause presentation to a user device associated with a user of a content item but refrain from causing presentation of the content item to a second attendee based on the second attendee not having access rights to the content item. One of the access control mechanisms that improve existing technologies is the concept of causing presentation of indications of content items to users in response to receiving a user request from a user that has access to those content items to share such content items.

Moreover, these and other embodiments also improve other computing resource consumption, such as network bandwidth, network latency, and I/O when searching for content items by determining a plurality of content items associated with a first attendee or meeting (or determining that the content items are in fact associated with the first attendee or meeting) that are candidates for presentation during a meeting. Instead of walking entire decision trees or other data structures when determining content items, particular embodiments can determine that a subset of content items are likely to be relevant for a meeting or particular attendee. This reduces storage device I/O because the storage device is accessed fewer times to perform read/write operations, which wears less on the read/write head. Moreover, because fewer data sources, nodes, or content items are considered, this decreases network latency and reduces bandwidth.

Overview of Exemplary Operating Environment

Figure 13:
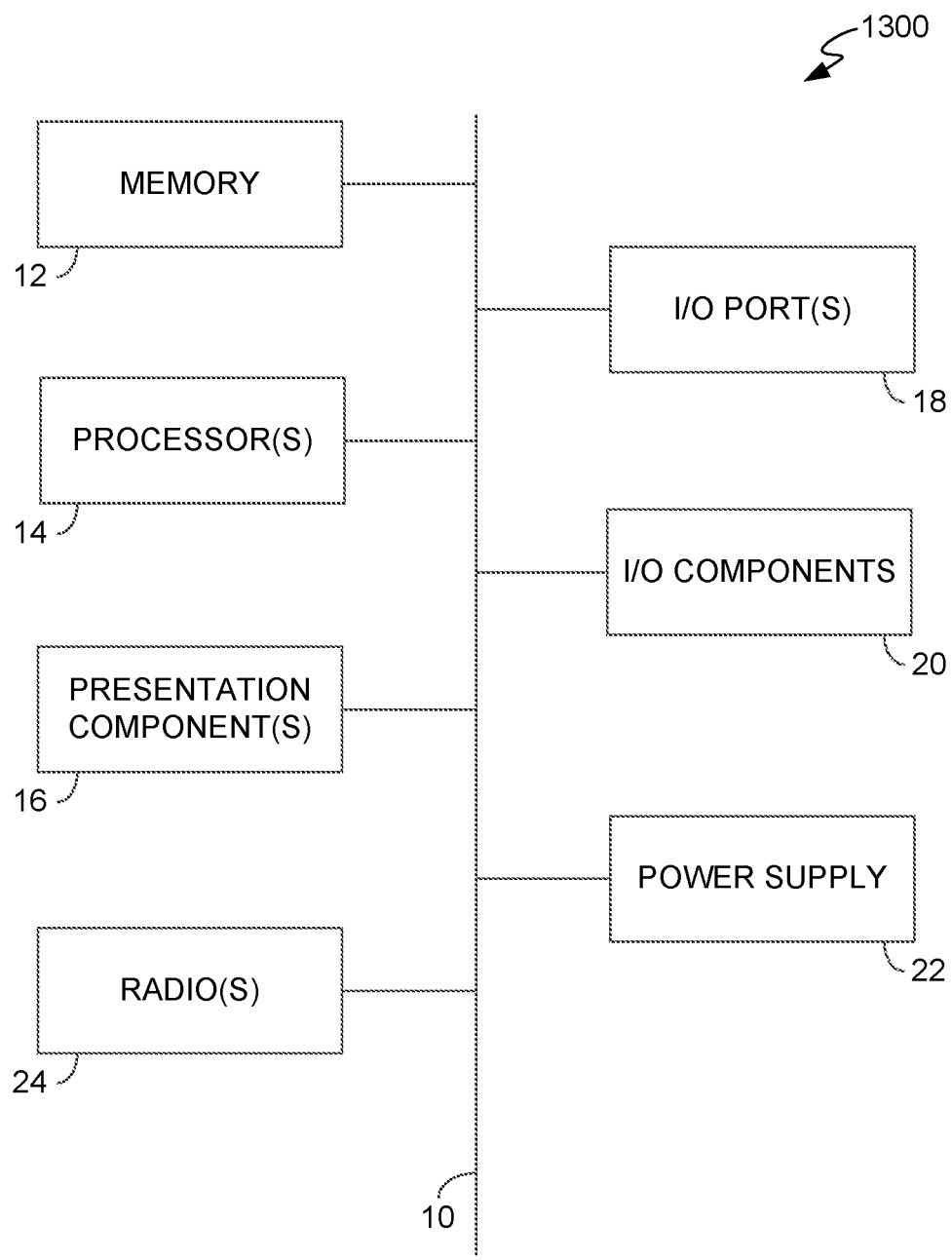
FIG. 13 is a block diagram of an example computing device suitable for use in implementing some embodiments described herein.

Having described various embodiments of the disclosure, an exemplary computing environment suitable for implementing embodiments of the disclosure is now described. With reference to FIG. 13, an exemplary computing device 1300 is provided and referred to generally as computing device 1300. The computing device 1300 is but one example of a suitable computing environment and is not intended to suggest any limitation as to the scope of use or functionality of the disclosure. Neither should the computing device 1300 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

With reference to FIG. 13, computing device 1300 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 13 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 13 and with reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 1300 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 1300 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

Some embodiments of computing device 1300 may include one or more radio(s) 24 (or similar wireless communication components). The radio 24 transmits and receives radio or wireless communications. The computing device 1300 may be a wireless terminal adapted to receive communications and media over various wireless networks. Computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
    at least one computer processor; and
    one or more computer storage media storing computer-useable instructions that, when used by the at least one computer processor, cause the at least one computer processor to perform operations comprising:
    detecting a first natural language utterance associated with one or more attendees of a meeting, the one or more attendees including a first attendee, the first natural language utterance being among a plurality of natural language utterances associated with the meeting;
    in response to the detecting of the first natural language utterance, determining, via an access control component, a plurality of files that the first attendee has access to, each file, of the plurality of files, being associated with a candidate for presentation, during the meeting, to a user device associated with the first attendee;
    generating a score for each file of the plurality of files;
    based at least in part on the score, ranking each file of the plurality of files;
    during the meeting and based at least in part on the ranking and the first attendee having access to the plurality of files via the access control component, causing presentation, to the first user device associated with the first attendee, of an indication of at least a first file of the plurality of files at least partially responsive to the detecting of the first natural language utterance;
    determining a second plurality of files associated with a second attendee of the meeting, each file, of the second plurality of files, being a candidate for presentation, during the meeting, to a second user device associated with the second attendee;
    based at least in part on the first natural language utterance, generating a second score for each file of the second plurality of files;
    based at least in part on the second score, ranking each file of the second plurality of files; and based at least in part on the first natural language utterance, the ranking of each file of the second plurality of files and the second attendee having access to the second plurality of files via the access control component, causing presentation, during the meeting and to the second user device associated with the second attendee, of another indication of at least the a second file, of the second plurality of files.

2. The system of claim 1, wherein the detecting of the first natural language utterance further includes encoding audio speech to first text data at a transcript document and performing natural language processing of the first text data to determine the first natural language utterance.

3. The system of claim 1, wherein the determining of plurality of files associated with the first attendee further includes performing a computer read of a network graph associated with the first attendee and selecting the plurality of files among other files, a first node of the network graph representing the meeting, a second set of nodes of the network graph representing at least one of: a respective file, of the plurality of files and the other files, the first attendee, and another attendee associated with the meeting.

4. The system of claim 1, wherein the presented indication includes a link to the data.

5. The system of claim 1, wherein the generating of the score for each file further includes predicting, via a weak supervision machine learning model, that the first file is a most relevant file relative to other files of the plurality of files.

6. The system of claim 5, wherein the predicting includes concatenating one or more of the following into a feature vector to be used as input to the weak supervision machine learning model: a first identifier that identifies the first attendee, the first natural language utterance, a second set of identifiers that each identify a respective attendee of the meeting, and a third identifier that identifies the meeting.

7. The system of claim 5, wherein the operations further comprise training the weak supervision model by programmatically assigning, without a human annotator, a first label to each file that is associated with an application item and assigning a second label to each content item that is not associated with the application item and learning which files are associated with the application item based on the first label and the second label.

8. The system of claim 1, wherein the causing presentation includes causing presentation of a document with highlighted characters, the highlighting of the characters being based at least in part on the first natural language utterance.

9. The system of claim 1, wherein the causing presentation further includes causing presentation of the first file or link to the first file and selectively refraining from causing presentation of other files or links to the other files.

10. The system of claim 1, wherein the operations further comprise refraining from causing presentation of the indication of the first file to the second user device based on the second attendee not having access rights to the first file.

11. The system of claim 1, wherein the operations further comprise:
receiving, via the first user device, a request for the first attendee to share the first file to the second attendee of the meeting; and
in response to the receiving of the request, causing presentation of the first file to the second user device associated with the second attendee.

12. The system of claim 1, wherein the operations further comprise, based at least in part on the context associated with the meeting causing presentation, prior to the meeting, of an indication of a second file, of the plurality of files, and wherein the plurality of files include one or more of a pre-read document and an agenda document associated with the meeting.

13. A computer-implemented method comprising:
detecting a first natural language utterance of one or more attendees associated with a meeting, the one or more attendees including a first attendee;
in response to the detecting, determining a plurality of documents associated with the meeting;
based on the first natural language utterance and at least one of: a first context associated with the meeting, or a second context associated with the first attendee, determining a score for each document of the plurality of documents;
based at least in part on the score, ranking each document of the plurality of documents for the first attendee;
determining, via an access control component, that the first attendee has access to a first document, of the plurality of documents;
during the meeting and based at least in part on; the ranking, the detecting of the first natural language utterance, and the determining that the first attendee has access to the first document, causing presentation, to the first user device associated with the first attendee, of an indication of at least the first document of the plurality of document;
based on the first natural language utterance and at least a third context associated with a second attendee of the meeting, ranking each document of the plurality of documents for a second attendee of the meeting; and
based at least in part on the ranking of each document of the plurality of documents for the second attendee and the second attendee having access to a second document, of the plurality of documents, causing presentation, during the meeting and to a second user device associated with the second attendee, of another indication of at least the second document of the plurality of documents.

14. The computer-implemented method of claim 13, wherein the causing presentation further includes causing presentation, to the first user device during the meeting, of the indication of the first document and selectively refraining from causing presentation of indications of any other document, of the plurality of documents.

15. The computer-implemented method of claim 13, further comprise causing presentation, to the user device before the meeting starts, of a second indication of a second document, wherein the second document including one of a pre-read document and an agenda document.

16. The computer-implemented method of claim 13, wherein the generating of the score for each document further includes predicting, via a weak supervision machine learning model, that the first document is a most relevant document relative to other documents of the plurality of documents.

17. The computer-implemented method of claim 13, further comprising refraining from causing presentation of the indication of the first document to the second user device based on the second attendee not having access rights to the first document.

18. One or more computer storage media having computer-executable instructions embodied thereon that, when executed by one or more processors, cause the one or more processors to perform operations comprising:

detecting a first natural language utterance of one or more attendees associated with a meeting, the one or more attendees including a first attendee;

in response to the detecting, determining a plurality of documents associated with at least one of: the meeting or first attendee;

based at least in part on at least one of: the first natural language utterance, a first context associated with the meeting, a second context associated with the first attendee, and a third context associated with another attendee of the meeting, determining a score for each document of the plurality of documents;

during the meeting and based at least in part on the score for each document of the plurality of documents, causing presentation, to the first user device associated with the first attendee, of an indication of at least a first document of the plurality of documents; and based at least in part on the first natural language utterance and a second attendee associated with the meeting not having access rights to the first document, refraining from causing presentation of the indication of the first document to a second user device.

\* \* \* \* \*